(12) United States Patent
Banowit

(10) Patent No.: US 9,950,492 B2
(45) Date of Patent: Apr. 24, 2018

(54) VARIABLE INSULATION SYSTEM FOR OUTDOOR EQUIPMENT

(71) Applicant: Channel Gear, LLC, Vienna, VA (US)

(72) Inventor: Steven W. Banowit, Vienna, VA (US)

(73) Assignee: Channel Gear, LLC, Vienna, VA (US)

( * ) Notice: Subject to any disclaimer, the term of this patent is extended or adjusted under 35 U.S.C. 154(b) by 243 days.

(21) Appl. No.: 14/250,020

(22) Filed: Apr. 10, 2014

(65) Prior Publication Data

US 2015/0290901 A1    Oct. 15, 2015

(51) Int. Cl.
| | | |
|---|---|---|
| *B32B 3/20* | (2006.01) | |
| *A47G 9/08* | (2006.01) | |
| *B32B 7/04* | (2006.01) | |
| *B32B 3/08* | (2006.01) | |
| *A41D 31/00* | (2006.01) | |

(52) U.S. Cl.
CPC ............ *B32B 3/20* (2013.01); *A47G 9/08* (2013.01); *B32B 3/08* (2013.01); *B32B 7/045* (2013.01); *A41D 31/0033* (2013.01); *B32B 2307/304* (2013.01); *B32B 2437/00* (2013.01)

(58) Field of Classification Search
CPC .............. A41D 13/00; B32B 5/02; B32B 1/06
USPC ............. 5/502, 482, 485, 486; 428/99
See application file for complete search history.

(56) References Cited

U.S. PATENT DOCUMENTS

| | | | | |
|---|---|---|---|---|
| 1,513,766 A * | 11/1924 | Spooner | ........... | F41H 1/02 109/82 |
| 1,893,548 A * | 1/1933 | Hardy | ........... | A47G 9/086 5/502 |
| 2,248,768 A * | 7/1941 | Licht | ........... | A47G 9/0207 5/485 |
| 3,331,088 A * | 7/1967 | Marquette | ........... | A47G 9/023 5/486 |
| 3,508,285 A * | 4/1970 | Marquette | ........... | A47G 9/023 5/486 |
| 3,837,021 A * | 9/1974 | Sellers | ........... | A47G 9/0207 5/502 |
| 4,185,327 A * | 1/1980 | Markve | ........... | A41D 13/0156 2/456 |
| 4,354,281 A * | 10/1982 | Satoh | ........... | A47G 9/086 2/97 |
| 4,631,765 A * | 12/1986 | Casey | ........... | A47G 9/0207 428/33 |

(Continued)

OTHER PUBLICATIONS

Definition of Sleeve.*

(Continued)

*Primary Examiner* — Maria V Ewald
*Assistant Examiner* — Travis M Figg
(74) *Attorney, Agent, or Firm* — Sterne, Kessler, Goldstein & Fox P.L.L.C.

(57) ABSTRACT

A variable insulation system for an article of outdoor equipment that allows a user to adjust the amount of insulation within the article of outdoor equipment. The article of outdoor equipment may include at least one resealable channel that is configured to receive one or more insulation pouches. The insulation pouches may include first and second attachment members for connecting the insulation pouches before they are inserted into the resealable channels. A user may add insulation pouches to or remove insulation pouches from the resealable channels depending on the user's insulation needs.

2 Claims, 17 Drawing Sheets

(56) References Cited

U.S. PATENT DOCUMENTS

| | | | | |
|---|---|---|---|---|
| 4,839,934 | A * | 6/1989 | Rojas | A47G 9/0207 5/485 |
| 4,864,656 | A * | 9/1989 | Nesse | A41D 3/00 2/108 |
| 4,894,878 | A * | 1/1990 | Roach | A47G 9/086 2/272 |
| 5,187,825 | A * | 2/1993 | Tesch | A47G 9/0207 5/482 |
| 5,208,927 | A * | 5/1993 | Lachmar | A47G 9/02 5/497 |
| 5,509,143 | A | 4/1996 | Yates et al. | |
| 5,617,583 | A | 4/1997 | Yates et al. | |
| 5,657,497 | A * | 8/1997 | Howe | A47G 9/086 2/243.1 |
| 5,706,535 | A * | 1/1998 | Takashima | A47G 9/007 5/485 |
| 5,713,079 | A * | 2/1998 | Simon | A41D 3/00 2/243.1 |
| 5,774,894 | A | 7/1998 | Yates et al. | |
| 5,802,877 | A | 9/1998 | Yates et al. | |
| 5,928,275 | A | 7/1999 | Yates et al. | |
| 6,189,149 | B1 * | 2/2001 | Allen | A41D 13/0055 2/102 |
| 6,243,896 | B1 * | 6/2001 | Osuna | A47G 9/0207 5/482 |
| 6,317,893 | B1 * | 11/2001 | Walton | A41D 13/012 2/227 |
| 6,338,173 | B1 * | 1/2002 | Ramsey | A47G 9/086 5/413 R |
| 6,449,787 | B1 | 9/2002 | Thorne | |
| 6,668,385 | B2 * | 12/2003 | Gathings, Jr. | A41D 3/02 2/97 |
| 6,745,401 | B1 * | 6/2004 | David | A41D 13/012 2/227 |
| 7,386,898 | B1 * | 6/2008 | Brun | A47G 9/086 2/69.5 |
| 8,585,746 | B2 * | 11/2013 | Ilcheva | A41D 13/0518 607/108 |
| 2003/0104739 | A1 * | 6/2003 | Jenkins | A41D 31/0061 442/135 |
| 2003/0154537 | A1 * | 8/2003 | Carey | A41D 19/01529 2/160 |
| 2003/0182708 | A1 * | 10/2003 | Gathings, Jr. | A41D 3/02 2/97 |
| 2003/0232552 | A1 * | 12/2003 | So | A47C 27/12 442/59 |
| 2005/0144696 | A1 * | 7/2005 | Lack | A41D 31/0038 2/69 |
| 2008/0249276 | A1 | 10/2008 | Alder et al. | |
| 2009/0205102 | A1 * | 8/2009 | Anderson | A41D 3/00 2/85 |
| 2009/0260711 | A1 | 10/2009 | Alder et al. | |
| 2009/0271909 | A1 * | 11/2009 | Hegland | A45F 4/12 2/69.5 |
| 2010/0083417 | A1 | 4/2010 | Alder et al. | |
| 2011/0094004 | A1 * | 4/2011 | Li | A47G 9/02 2/69 |
| 2011/0165371 | A1 * | 7/2011 | Leonard | B32B 3/28 428/99 |
| 2012/0037269 | A1 | 2/2012 | Alder et al. | |
| 2013/0177731 | A1 * | 7/2013 | Moriarty | B32B 27/12 428/74 |

OTHER PUBLICATIONS

Hans Aschim, "A reversible jacket featuring a new material that increases or decreases internal temperature," published on Mar. 3, 2014, accessed at http://www.coolhunting.com/design/polychromelab.php, accessed on Sep. 12, 2014, 14 pages.

"Kammok Kickstarts 'The Last Sleeping Bad You'll Ever Need,'" published on Dec. 17, 2013, accessed http://trekalong.com/blog/2013/12/17/kammok-kicksarts-the-last-sleeping-bag-youll-ever-need/, accessed on Sep. 15, 2014, 3 pages.

Heat Factory, "Hunting Catalog 2007-2008," pp. 27-44.

* cited by examiner

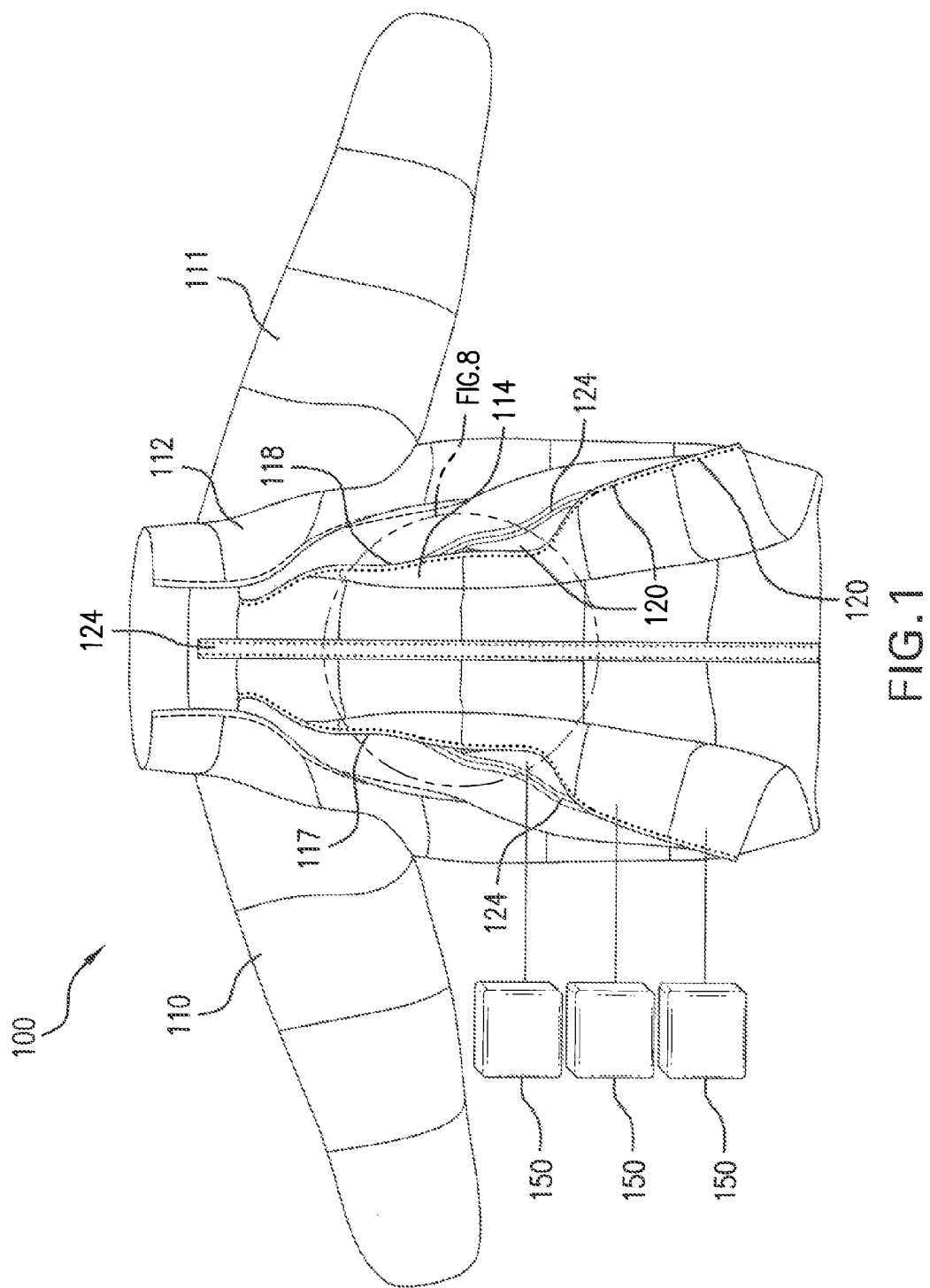

VARIABLE INSULATION SYSTEM FOR OUTDOOR EQUIPMENT

FIELD OF THE INVENTION

This invention relates to outdoor equipment, and more particularly to a variable insulation system for outdoor equipment.

BACKGROUND

Outdoor equipment, such as a sleeping bag or a jacket, is traditionally manufactured with a specific amount of insulation depending on the intended outdoor use. For example, a sleeping bag with a 20° F. temperature rating means that the sleeping bag is intended to be used in situations where the outdoor temperature is no less than 20° F. The amount, type, and configuration of insulation within the sleeping bag dictate the temperature rating of the sleeping bag, the lowest outdoor temperature at which the sleeping bag should keep an average sleeper warm and prevent the risk of hypothermia. This same concept applies to other types of outdoor equipment, such as jackets, pants, gloves, etc. Traditional insulation materials include down and synthetic batting. The loft or thickness of the insulation material creates pockets of dead air space that hinder the transfer of heat from the user's body thereby keeping the user warm.

Since insulation is traditionally sewn into an article of outdoor equipment, the insulating properties are fixed. This can create uncomfortable and undesirable situations for a user. If the user's needs differ from what is offered by the equipment the user has on hand, the user must suffer the existing level of insulation, or add or remove redundant pieces of equipment in order to attain the required level of insulation. For example, in cold weather situations, a camper may be forced to layer various articles of equipment to achieve increased warmth. This increases the number and weight of articles that must be carried by the camper during his or her trip. In contrast, in warm weather situations, a camper's equipment may be uncomfortably warm.

As such, consumers generally have to buy various articles of outdoor equipment for different situations. For example, a camper must buy different types of sleeping bags for different times of the year. A sleeping bag with a very low temperature rating is needed for camping during the winter, but would be uncomfortably warm in the summer. Similarly, consumers generally have to buy coats or jackets with different amounts of insulation for different seasons and/or situations. For example, a highly insulated coat is desired for extremely cold winter months, whereas a jacket with less insulation is desired for fall and spring months.

Accordingly, there is a need for outdoor equipment that allows a user to adjust the amount of insulation depending on the conditions when used.

SUMMARY OF THE INVENTION

A variable insulation system for an article of outdoor equipment that allows a user to adjust the amount of insulation within the article of outdoor equipment. The article of outdoor equipment includes a plurality of resealable channels that are configured to receive one or more insulation pouches.

In some embodiments, an article of outdoor equipment includes an interior layer, an exterior layer, a plurality of resealable channels disposed between the interior layer and the exterior layer, and a plurality of insulation pouches. Each resealable channel being configured to receive one or more of the plurality of insulation pouches.

In some embodiments, a coat includes an interior layer, an exterior layer, and a plurality of resealable channels disposed between the interior layer and the exterior layer. The plurality of resealable channels being disposed in a body of the coat and one or more sleeves of the coat. The plurality of resealable channels configured to receive at least one insulation pouch.

in some embodiments, a sleeping bag includes an interior layer, an exterior layer, a first set of resealable channels disposed along the top of the sleeping bag between the interior layer and the exterior layer, each resealable channel in the first set of resealable channels having a. closed end and a resealable end, and a second set of resealable channels disposed along the bottom of the sleeping bag between the interior layer and the exterior layer, each resealable channel in the second set of resealable channels having a closed end and a resealable end. The closed ends of the first set of resealable channels abutting the closed ends of the second set of resealable channels. Each resealable channel configured to receive at least one insulation pouch.

BRIEF DESCRIPTION OF THE DRAWINGS

FIG. 1 shows a coat according to one embodiment.

DETAILED DESCRIPTION

Figure 2A:
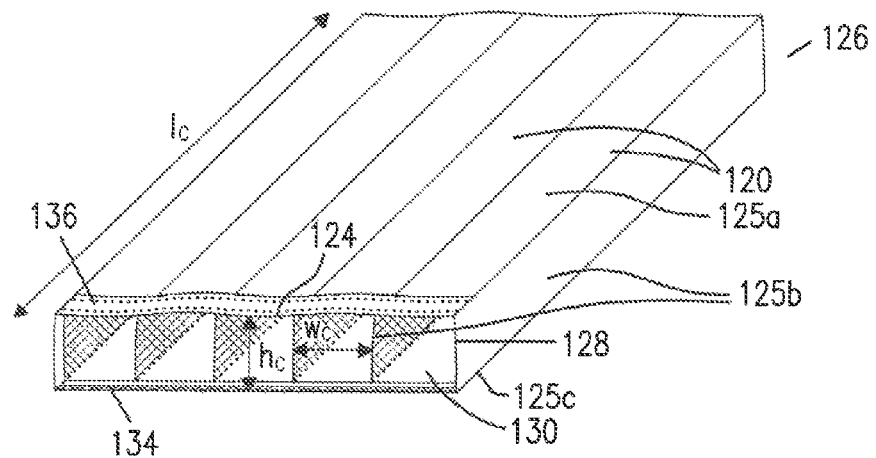
FIG. 2A shows a perspective view of a plurality of resealable channels according to one embodiment.

This specification discloses one or more embodiments that incorporate the features of this invention. The disclosed embodiment(s) merely exemplify the invention. The scope of the invention is not limited to the disclosed embodiment(s). Multiple inventions may be described. The invention is defined by the claims appended hereto.

The embodiment(s) described, and references in the specification to "one embodiment", "an embodiment", "an example embodiment", etc., indicate that the embodiment(s) described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is understood that it is within the knowledge of one skilled in the art to implement such feature, structure, or characteristic in connection with other embodiments whether or not explicitly described.

A variable insulation system 100 according to one embodiment is shown in FIG. 1. System 100 includes an article of outdoor equipment, such as a coat 110, and a plurality of resealable channels 120, disposed between the coat's exterior layer 112 and interior layer 114, configured to receive one or more insulation pouches 150. Resealable channels 120 allow the insulative property of coat 110 to be manually adjusted by a user to accommodate changing insulation requirements. Variable insulation may be provided by filling channels 120 with a variable quantity and/or density of insulating material contained within one or more insulation pouches 150, or by removing such pouches.

As would be apparent to one of ordinary skill in the art, a traditional down or synthetic insulated jacket, sleeping bag, etc., is manufactured either with a sewn through construction or a box baffle construction. In a sewn through construction, the outer shell layer of the jacket is stitched directly to the inner lining layer of the jacket, creating a plurality of baffles, which are then stuffed with down or a synthetic insulator and sewn closed. The separate baffles defined by the stitching prevent migration of the down or synthetic insulator in the jacket, but result in reduced loft at the seams. In a box baffle construction, one or more layers of square or rectangular boxes are sewn in between the outer shell and inner lining of the jacket, which are then stuffed with down or a synthetic insulator and sewn closed. The open box baffles allow the down or synthetic insulator to have more loft, as compared to the sewn through construction. Some articles have both constructions, for example, a jacket or coat may have a box baffle construction through the chest and back and a sewn through construction in the arms.

Resealable channels 120 may have various constrictions, including, but not limited to, a sewn through or box construction, but unlike traditional baffles, channels 120 are not pre-filled with down or a synthetic insulator or sewn shut. Rather, channels 120 define an open interior volume configured to receive one or more insulation pouches 150. Further, channels 120 are resealable to allow manual adjustment by a user to accommodate changing insulation requirements. Channels 120 may be variably filled, emptied and refilled by a user as needed.

Access to channels 120 is accomplished by one or more resealable closures 124. For example, a hook and loop fastener may be disposed along the interior of a coat near the zipper to allow access to channels 120 from the front of coat 110 while a user is wearing the coat. Further access may be provided by a hook and loop fastener, or other fastener, disposed on the inside back of coat 110. Resealable closure 124 on inside back of coat 110 may be offset from the center of the back, so that the resealable closure will be less apparent to the user when wearing the coat. Channels 120 in the sleeves 111 may be accessed by turning sleeves 111 inside-out and opening a hook and loop fastener, or other fastener, running the length of the sleeve. In an alternative embodiment, one or more channels 120 may have a separate resealable closure, so that access to a single channel 120 is provided when the resealable closure is opened.

Channels 120 according to one embodiment are shown in FIG. 2A. As shown in FIG. 2A, a channel 120 is defined by a top wall 125a, two side walls 125b, and a bottom wall 125c. Each channel 120 may also include a closed end 126 and a resealable end 128 with an open interior volume 130 located in between closed end 126 and resealable end 128. Open interior volume 130 has a height ($h_c$), a width ($w_c$), and a length ($l_c$). Side walls 125b may be comprised of a fabric material selected from the group including, but not limited to, fishnet type fabrics, elastic fabrics, heat-reflective fabrics and combinations thereof.

Resealable end 128 allows a user to fill open interior volume 130 with a desired amount of insulation and can be sealed and un-sealed using resealable closure 124. Resealable closure 124 includes a first sealing member 134 that attaches to a second sealing member 136. In use, a user opens resealable closure 124, fills channel(s) 120 with the desired amount of insulation pouches 150 and then reseals channel 120 by closing resealable closure 124. First sealing member 134 and second sealing member 136 include resealable attachment members including, but are not limited to, buttons, button holes, a zipper, hooks, loops, male snap fasteners, female snap fasteners, and other known resealable attachment means in the art. Furthermore, first sealing member 134 and second sealing member 136 may include a flap having resealable attachment members thereon, the flap extending from interior layer 114 of coat 110.

While FIG. 2A shows a single resealable closure 124 for sealing each channel 120, it will be appreciated that each channel 120 may have an independent resealable closure for opening and closing that channel. In other words, each channel 120 may be individually accessed via a resealable closure provided for each channel. Furthermore, while FIG. 2A shows channel 120 having a resealable end 128 and a closed end 126, it will be appreciated that closed end 126 may be replaced with a resealable end to allow access to the channel from both ends.

In some embodiments, the top wall 125a and the bottom wall 125c are formed by exterior layer 112 and interior layer 114 of coat 110, respectively. In other words, each channel 120 is formed by attaching a plurality of side walls 125b between the exterior layer 112 and interior layer 114. In some embodiments, top wall 125a and bottom wall 125c are formed using a separate layer of fabric. For example, top wall 125a and/or bottom wall 125c may be comprised of a layer of fabric located between exterior layer 112 and interior layer 114. In such an embodiment, top wall 125a and/or bottom wall 125c may be comprised of a fabric material selected from the group including, but not limited to, fishnet type fabrics, elastic fabrics, heat-reflective fabrics and combinations thereof. Furthermore, it will be appreciated that any number of additional inner layers may be present between exterior layer 112 and interior layer 114.

For example, but not limited thereto, additional inner layers may include, water-proofing layers, heat-reflective layers, wind-resistant layers, etc.

Figure 2B:
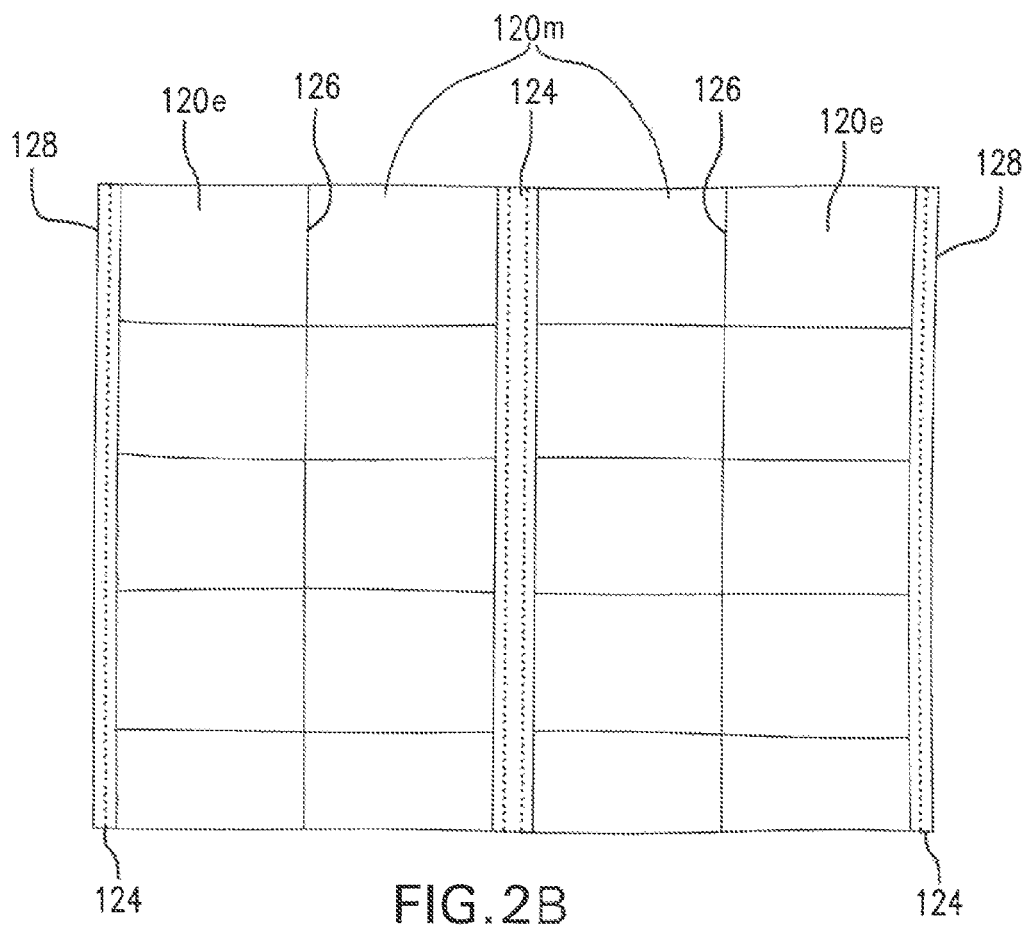
FIG. 2B shows a plurality of resealable channels according to another embodiment.

In some embodiments, each channel 120 extends from a first end of an article of equipment to a second end of the article of equipment. In some embodiments, as shown in FIG. 2B, an article of equipment may include a plurality of channels 120 aligned in a row so as to extend from a first end of an article of equipment to a second end of the article of equipment. As a non-limiting example, three channels may be aligned so as to wrap around the circumference of coat 110 from a first end 117 to a second end 118. As shown in FIG. 2B, the three channels may include two end channels 120e and a middle channel 120m. The two end channels 120e each have a resealable end 128 and a closed end 126. Each resealable end 128 may include a resealable closure 124. Closed end 126 may have a sewn through configuration or a box type configuration. In a box type configuration, there is no seam sewn through the coat's exterior layer 112 and interior layer 114.

Middle channel 120m in FIG. 2B is defined by two closed ends 126. In contrast to end channels 102e, middle channel 120m may be accessed via a resealable closure 124 located along interior layer 114 of coat 110 near the center of middle channel 120m. Resealable closure 124 may include similar sealing elements, such first sealing member 134 and second sealing member 136, as described above with reference to FIG. 2A. Resealable closure 124 allows a user to access middle channel 120m to add and/or remove insulation, e.g., insulation pouches 150, from middle channel 120m. Resealable closure 124 allows a user to access both sides of middle channel 120m. Preferably, resealable closure 124 for middle channel 120m is located off the center of middle channel 120m, so that the resealable closure 124 will be less apparent to a user wearing coat 110.

The channel construction in FIG. 2B may be preferred for some articles of equipment. Using a plurality of aligned channels increases the ease in which a user can load pouches 150 into channels 120. Shorter channels are easier to fill with pouches 150 because a user does not need to force insulation down a long channel. Shorter channels also facilitate uniform pouch distribution and alignment again because the pouches are more easily loaded into the channel. Providing a plurality of aligned channels also increases the flexibility of the article of equipment. A user can load specific channels 120 with more or less insulation as desired.

However, using longer channels, for example a single channel that extends all the way from first end 117 to second end 118, reduces the number of channels a user has to fill. Providing insulation pouches that may be connected to each other, as described below in reference to FIGS. 7A and 7B, facilitates filling longer channels. Furthermore, longer channels also reduce the number of possible seams and/or sewing operations needed to produce an article of equipment.

While FIG. 2B shows three aligned channels, it is appreciated that any number of channels may be aligned so as to extend from a first end of an article to a second end of the article. Channels may run horizontally or vertically or both. Furthermore, it should be appreciated that each row of channels need not include the same number of aligned channels. Furthermore, while FIG. 2A shows channels having a square shaped cross-section; it is appreciated that the cross-section of channels 120 may have any shape. The cross-section of channels 120 may have any polygonal shape including, but not limited to, rectangular, triangular, hexagonal, and octagonal shapes. Additionally, the cross-section of channels 120 may be circular or elliptical in shape.

In some embodiments, the sleeves 111 attached to a body of coat 110 may also include a plurality of resealable channels 120. The resealable channels 120 in sleeve 111 may wrap around the circumference of sleeves 111. In some embodiments, a single channel wraps all the way around the circumference of sleeves 111. In some embodiments, a plurality of channels are aligned so as to wrap around the circumference of sleeves 111. In some embodiments, sleeves 111 include at least one resealable closure 124 located on the interior of the sleeves that a user accesses by turning sleeves 111 inside-out. In some embodiments, sleeves 111 include at least one resealable closure 124 located on the exterior of the sleeves 111. Resealable closure(s) 124 on sleeves 111 may include similar sealing elements, such first sealing member 134 and second sealing member 136, as described above with reference to FIG. 2A and allow a user to access the resealable channels 120 located on sleeves 111.

Insulation pouches 150 are akin to miniature pillows, bean bags, or box-like cushions in that they are made of a soft and flexible material that is stuffed with an insulating material, such as, but not limited to, down, synthetic batting, etc., and then sealed shut. The material used to make insulation pouches 150 may include, but is not limited to, nylon, rip-stop nylon, cotton, polyester, or GORE-TEX. Preferably, insulation pouches 150 are made of rip-stop nylon that is downproof. If the article of equipment into which the insulation pouches 150 will be inserted is not itself made of waterproof material, it may be desirable for the insulation pouches 150 to be made of waterproof or water resistant material and/or stuffed with a waterproof or water resistant insulating material.

Figure 3A:
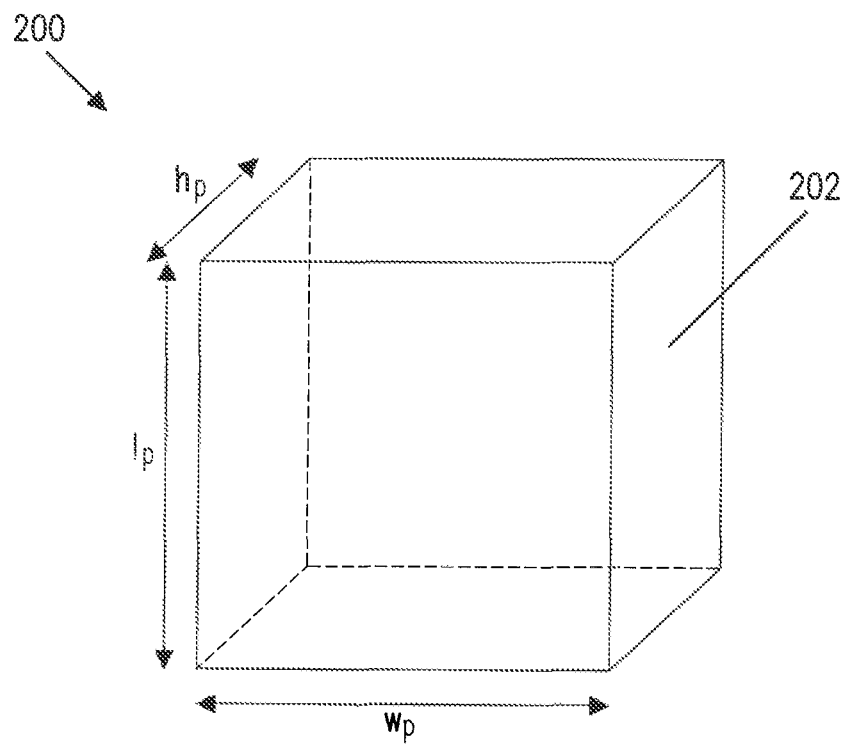
FIG. 3A shows an insulation pouch according to one embodiment.
Figure 3B:
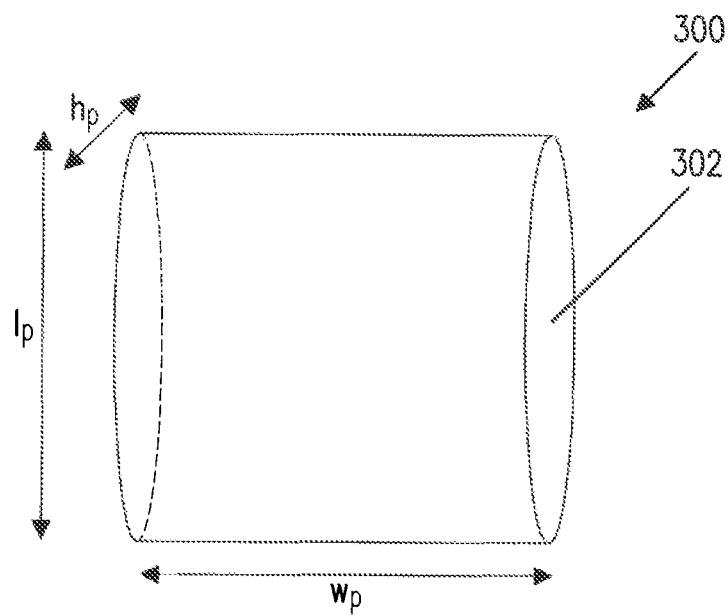
FIG. 3B shows an insulation pouch according to another embodiment.

Insulation pouches 150 are shaped and sized to fit within channels 120. Preferably, insulation pouches 150 are either a box-type pouch 200 (shown in FIG. 3A) or a sewn-through pouch 300 (shown in FIG. 3B). Preferably, insulation pouches 200 and 300 are manufactured in standard sizes that can be inserted into any channel 120. Box-type pouches 200 have superior insulation properties compared to sewn-through pouches 300 because they do not have tapered sections with less insulation that tend to result in heat loss. However, sewn-through pouches are sufficient for moderate insulation needs and are easier and cheaper to produce.

Standard sized pouches along with a specification related to the fill power of the down or insulation within the pouches allow a consumer to identify how much insulation material is in a pouch. As such, a consumer can easily identify how much insulation they are purchasing. Pouches may be made in any size and may include insulation having any amount of fill power or warmth rating.

Box-type insulation pouches 200 may be constructed using a method similar to the way box-like cushions are made. In some embodiments, box-type insulation pouches may be made by sewing two or more pieces of fabric together to form a box like shape. In one embodiment, a box-type pouch may be made by sewing a top square piece, a bottom square piece, and a rectangular side piece together. In such an embodiment rectangular side piece may be sewn to the perimeter of the top piece and the bottom piece. Side piece may be sewn completely around the perimeter of the top piece, but may be sewn to the bottom piece such that a small portion left unsewn, i.e. a gap is present in the seam between the bottom piece and the side piece. This gap allows the pouch to be flipped inside out so as to hide the seams created by sewing the top and bottom pieces to the side piece. Additionally, the gap allows the pouch to be filled with insulation material after it has been flipped inside out. After the pouch is filled with insulation material the gap may be sewn shut. In some embodiments, a box-type pouch may be made using a single piece of fabric. Alternatively or additionally, the pieces of fabric may be heat sealed together.

Sewn-through pouches may be constructed using a method similar to the way pillows are made. For example, a top piece of fabric may be sewn to a bottom piece of fabric. Preferably, a small portion of the top piece is left unsewn to the bottom piece, i.e. a gap is present in the seam between the bottom piece and the top piece. This gap allows the pouch to be flipped inside-out so as to hide the seams created by sewing the top piece to the bottom piece. Additionally, the gap allows the pouch to be filled with insulation material after it has been flipped inside out. After the pouch is filled with insulation material the gap may be sewn shut. In some embodiments, a sewn-through insulation pouch may be made using a single piece of fabric. Alternatively or additionally, the pieces of fabric may be heat sealed together.

Preferably, insulation pouches 200/300 are designed to be modular so that they can be moved from one article of equipment to another and are universally sized so as to fit various articles without adjustment. For example, each pouch 200 and 300 has a body 202 and 302, respectively, having a height ($h_p$), a width ($w_p$), and a length ($l_p$). Preferably, the height ($h_p$) and the width ($w_p$) of the bodies 202 and 302 correspond to the height ($h_c$) and the width ($w_c$) of open interior volumes 130. Pouch bodies having a height and width that correspond to the height and width of open interior volumes 130 provide for a tight fit between pouches 200/300 and channels 120. A tight fit between insulation pouches 200/300 and channels 120 ensures that the pouches remain in place and aligned, thereby preventing unwanted gaps between insulation pouches that would decrease the insulation properties of the channels.

The height ($h_p$ and $h_c$) of pouch bodies and the open interior volumes may be, but is not limited to, between 1 and 12 inches. The width ($w_p$ and $w_c$) of the pouch bodies and the open interior volumes may be, but is not limited to, between 1 and 12 inches. Preferably, the height ($h_p$ and $h_c$) of the pouch bodies and the open interior volumes is between 1 and 8 inches and the width ($w_p$ and $w_c$) of the pouch bodies and the open interior volumes is between 1 and 8 inches. More preferably, the height ($h_p$ and $h_c$) of the pouch bodies and the open interior volumes is 2 inches and the width ($w_p$ and $w_c$) of the pouch bodies and the open interior volumes is 6 inches.

The length ($l_p$) of insulation pouch bodies 202 and 302 is preferably equal to or smaller than the length ($l_c$) of open interior volume 130. The length ($l_p$) of the insulation pouch bodies may be, but is not limited to, between 4 and 12 inches. Preferably, the length ($l_p$) of the insulation pouch bodies is between 6 and 10 inches. More preferably, the length ($l_p$) of the insulation pouch bodies is 6 inches. Preferably, the length ($l_c$) of the open interior volumes is a multiple of the length ($l_p$) of an insulation pouch bodies, the multiple being greater than or equal to 1.

As a first non-limiting example, end channels 120e in FIG. 2B may be configured to receive a single insulation pouch, such as a box-type pouch 200. In such an embodiment, $l_p$ and $l_c$ may be equal to six inches. As a second non-limiting example, middle channel 120m in FIG. 2B may be configured to receive three insulation pouches 200. In such an embodiment, $l_p$ may be equal to 6 inches and $l_c$ may be equal to 18 inches.

Preferably, insulation pouches 150 are deformable and may be placed in open interior volume 130 in a stacked configuration, e.g. two insulation pouches 150 stacked and compressed to fit into open interior volume 130. In other words, while the height ($h_p$) of the insulation pouches 150 corresponds to the height ($h_c$) of the open interior volumes 130, the height of two insulation pouches 150 may be compressed to a fraction of their original height, width, and/or length when placed into an open interior volume 130.

Insulation pouches may be re-shaped in any manner so as to fit into an open interior volume. For example, insulation pouches 150 may be balled-up or rolled into a tube-like shape for insertion into different sized, irregular, or nonstandard sized channels. For example, a coat many include a collar that wraps around the neck of a wearer and/or draft tube for insulating the seam located at a zipper on the coat. The collar and draft tube may be filled with insulation pouches that are rolled into a tube-like shape.

The dimensions of the pouches above are described in terms of their fully expanded form, i.e. when the insulation material within the pouches is at full loft. Since the pouches are deformable, they may be compressed for easy insertion into the channels, and once inserted, may expand to their full loft. The dimensions of the interior volume above are described in terms of their relaxed state, i.e. the state of the channel with no forces acting on it. The material used to construct the channels 120 may allow them to expand while a user is inserting pouches.

FIGS. 4A-4B and 6A-6B show box-type insulation pouches 200 according to one embodiment. Box-type pouch 200 includes body 202 having an outer surface 204 including six sides, at least one of the sides being a connection side 205. At least one first connection area 206 including a connector flap 208 extends from connection side 205. Additionally, connection side 205 includes least one second connection area 212. First connection areas 206 and second connection areas 212 are configured to connect one box-type insulation pouch 200 to another other box-type insulation pouch 200. Different pouches are connected to each other via first attachment members 210, located on first connection areas 206, and second attachment members 214, located on second connection areas 212. By placing two connector flaps 208 and two opposing second connection areas 212 oil insulation pouch 200, insulation pouches 200 can be connected together horizontally and vertically to form any number of shapes and sizes (see FIGS. 7A and 7B).

For example, a user might want to connect a horizontal row of insulation pouches, e.g. three pouches, for insertion into a channel 120 in coat 110, Another user might wish to connect pouches both horizontally and vertically to create a blanket size set of pouches for insertion into a sleeping bag shell, a sleep shelter, etc.

Figure 4A:
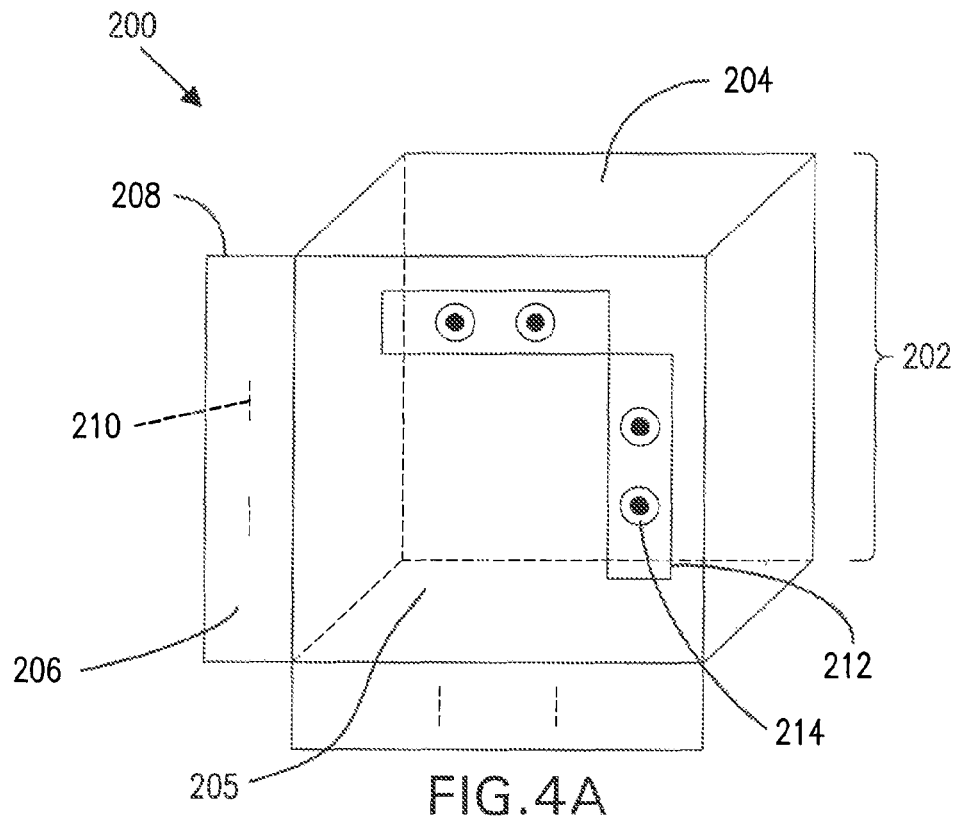
FIG. 4A shows an insulation pouch according to one embodiment.
Figure 4B:
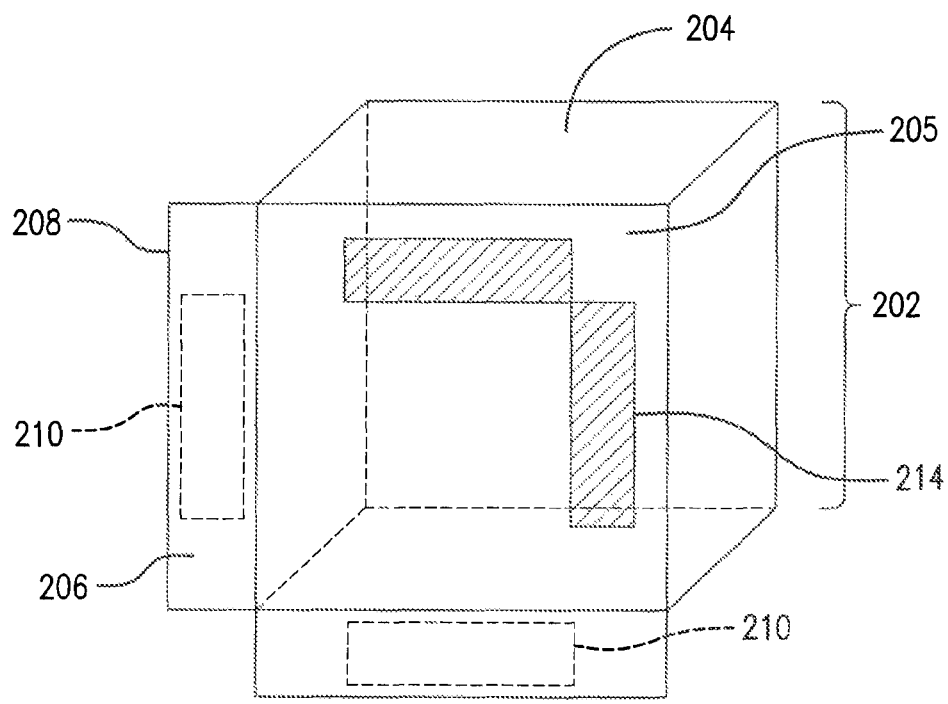
FIG. 4B shows an insulation pouch according to another embodiment.
Figure 6A:
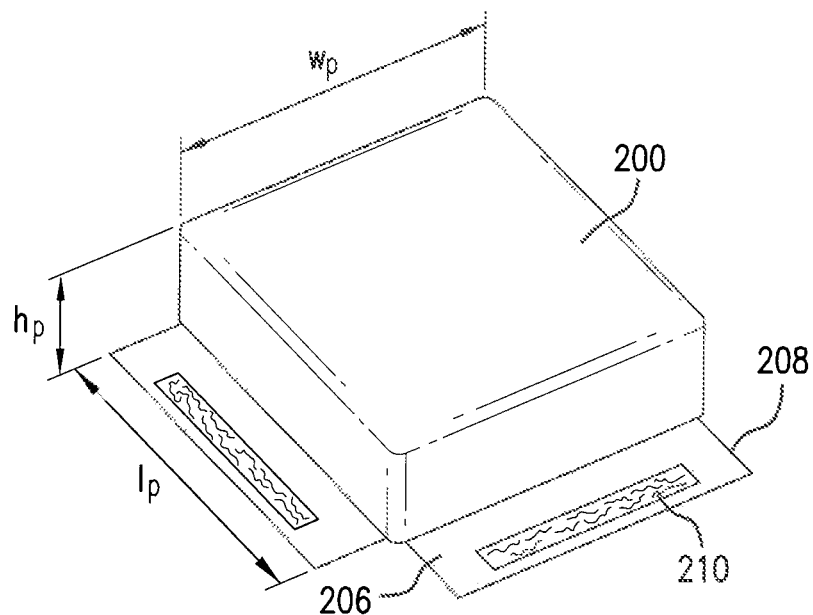
FIGS. 6A and 6B show an insulation pouch according to one embodiment.
Figure 6B:
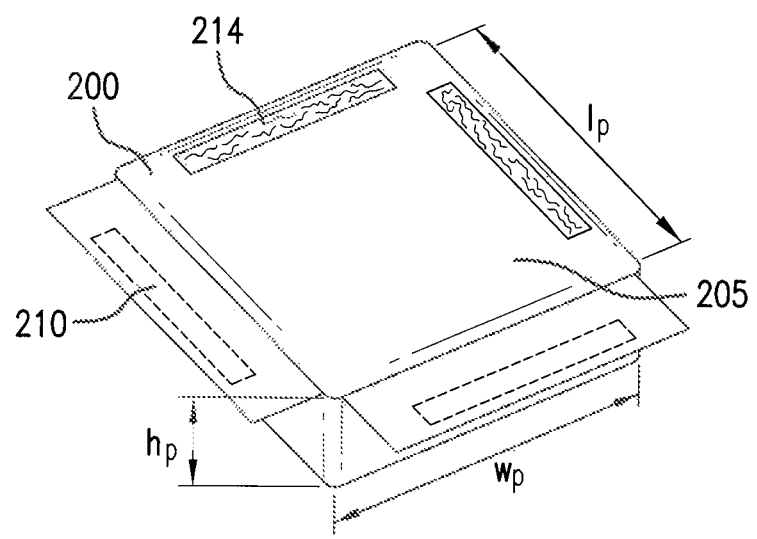

First attachment members 210 may be, but are not limited to, buttons, button holes, a zipper, hooks, loops, male snap fasteners, female snap fasteners, and other known releasable attachment means in the art. Second attachment members 214 may be, but are not limited to, buttons, button holes, a zipper, hooks, loops, male snap fasteners, female snap fasteners, and other known releasable attachment means in the art. Preferably, first attachment members 210 complement second attachment members 214. FIG. 4A illustrates first attachment members 210 that are buttons holes and second attachment members 214 that are buttons. FIGS. 4B and 6A-6B illustrate first attachment members 210 that are hooks, such as, but not limited to, VELCRO hooks, and second attachment members 214 that are loops, such as, but not limited to, VELCRO loops.

Figure 5A:
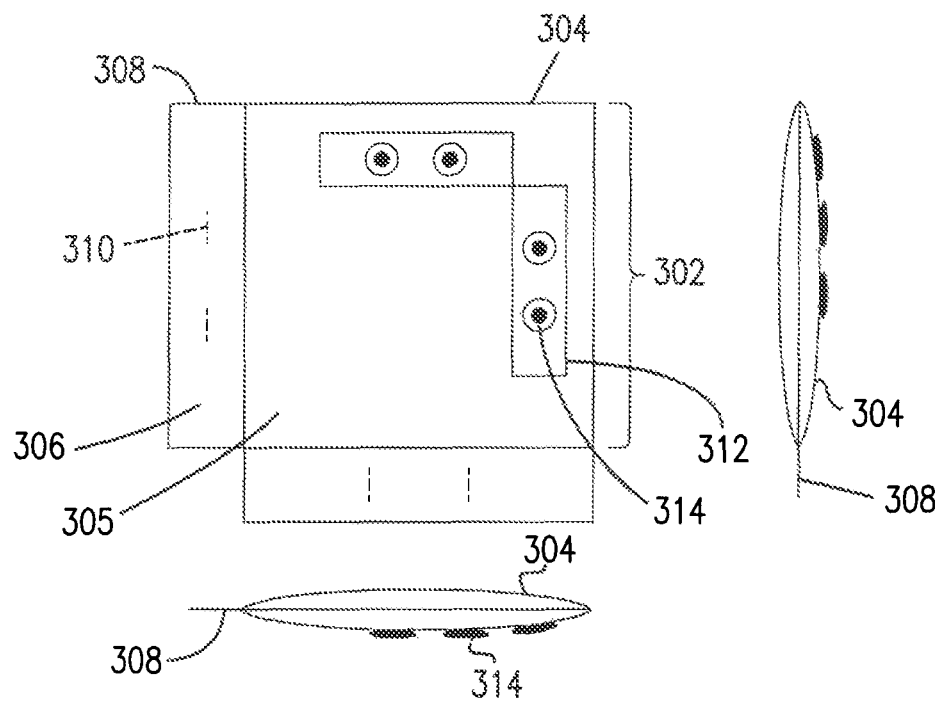
FIG. 5A shows an insulation pouch according to one embodiment.
Figure 5B:
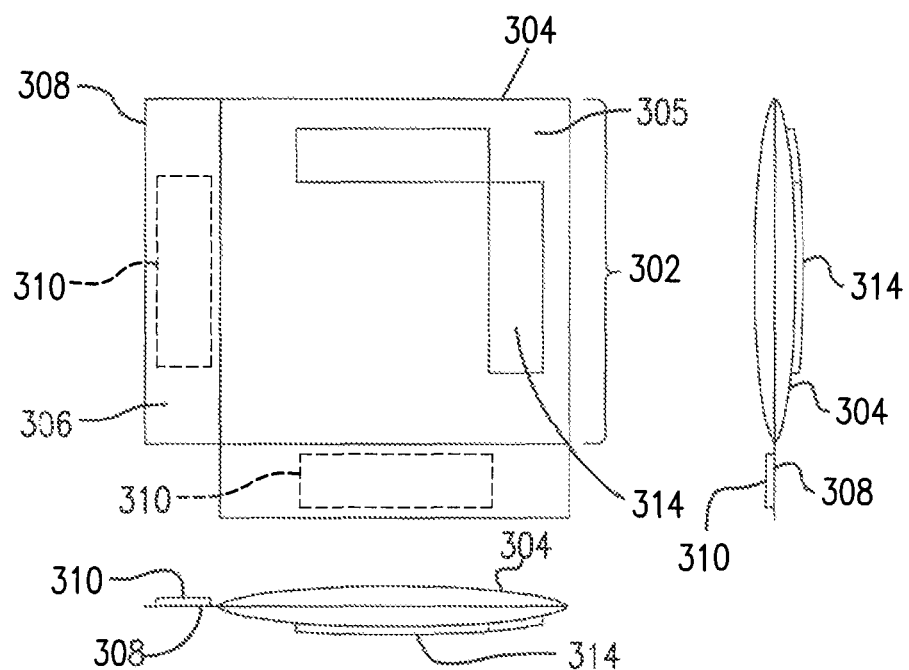
FIG. 5B shows an insulation pouch according to another embodiment.

FIGS. 5A and 5B show sewn through insulation pouches 300 according to one embodiment. Sewn-through insulation pouches 300 include body 302 having an outer surface 304 including a connection side 305. At least one first connection area 306 including a connector flap 308 extends from connection side 305. Additionally, connection side 305 includes least one second connection area 312. First connection areas 306 and second connection areas 312 are configured to connect one sewn-through. insulation pouch 300 to another other sewn-through insulation pouch 300. Different pouches are connected to each other via. first attachment members 310, located on first connection areas 306, and second attachment members 314, located on second connection areas 312. By placing two connector flaps 308 and two opposing second. connection areas 312 on insulation pouch 300, insulation pouches 300 can be connected together horizontally and vertically to form any number of shapes and sizes.

First attachment members 310 may be, but are not limited to, buttons, button boles, a zipper, hooks, loops, male snap fasteners, female snap fasteners, and other known releasable attachment means in the art. Second attachment members 314 may be, but are not limited to, buttons, button holes, a zipper, hooks, loops, male snap fasteners, female snap fasteners, and other known releasable attachment means in the art, Preferably, first attachment members 310 complement second attachment members 314. FIG. 5A illustrates first attachment members 310 that are buttons holes and second attachment members 314 that are buttons. FIG. 5B illustrates first attachment members 310 that are hooks, such as, but not limited to, VELCRO hooks, and second attachment members 314 that are loops, such as, but not limited to VELCRO loops.

In some embodiments, connector flaps 208/308 are a separate piece of fabric that is sewn to the insulation pouches during construction. In some embodiments, connector flaps 208/308 are an integral part of the top or bottom piece used to construct the insulation pouches. For example, in the construction methods described above, top piece may be cut so that is elongated at two sides such that when the sewn pouch is flipped. inside-out the elongated sides extend from the pouch, thereby forming connector flaps 208/308.

Figure 7A:
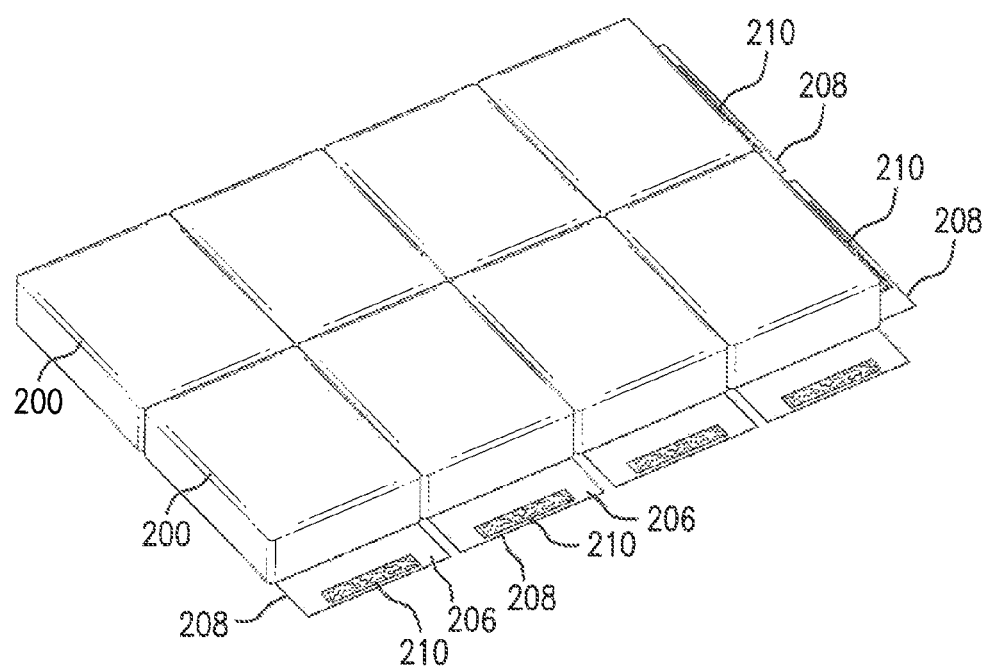
FIGS. 7A and 7B show a plurality of connected insulation pouches according to one embodiment.
Figure 7B:
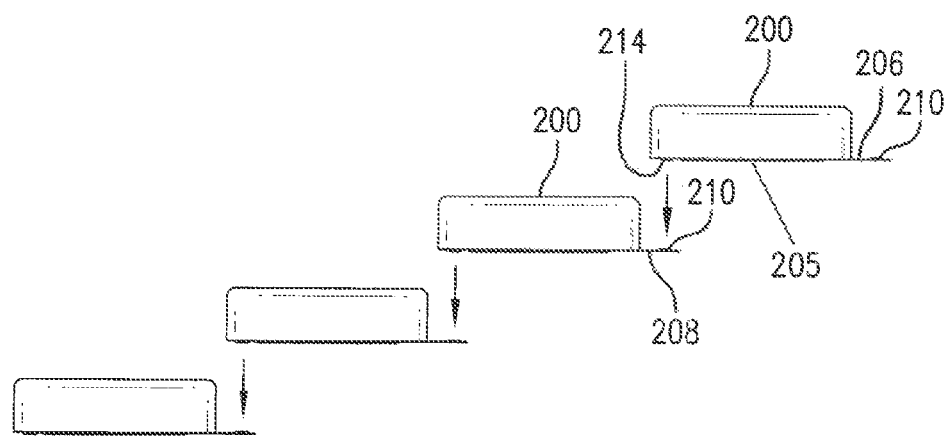

FIG. 7A shows a plurality of box-type insulation pouches 200 connected horizontally and vertically using connection areas 206 and 212, FIG. 7B shows a side view illustrating how box-type pouches 200 are connected. As shown in FIG. 7B, first connection areas 206, including connector flaps 208, overlap with the connection sides 205 of an adjacent box-type insulation pouch 200 having second attachment members 214. The overlap of connector flaps 208 allows first attachment members 210 to attach to second attachment members 214. Furthermore, the overlap of connector flaps 208 securely holds adjacent pouches 200 together and ensures that there is no gap between adjacent pouches 200. Any gaps between adjacent pouches 200 would result in a decrease in the insulation characteristics of the connected pouches.

Figure 8:
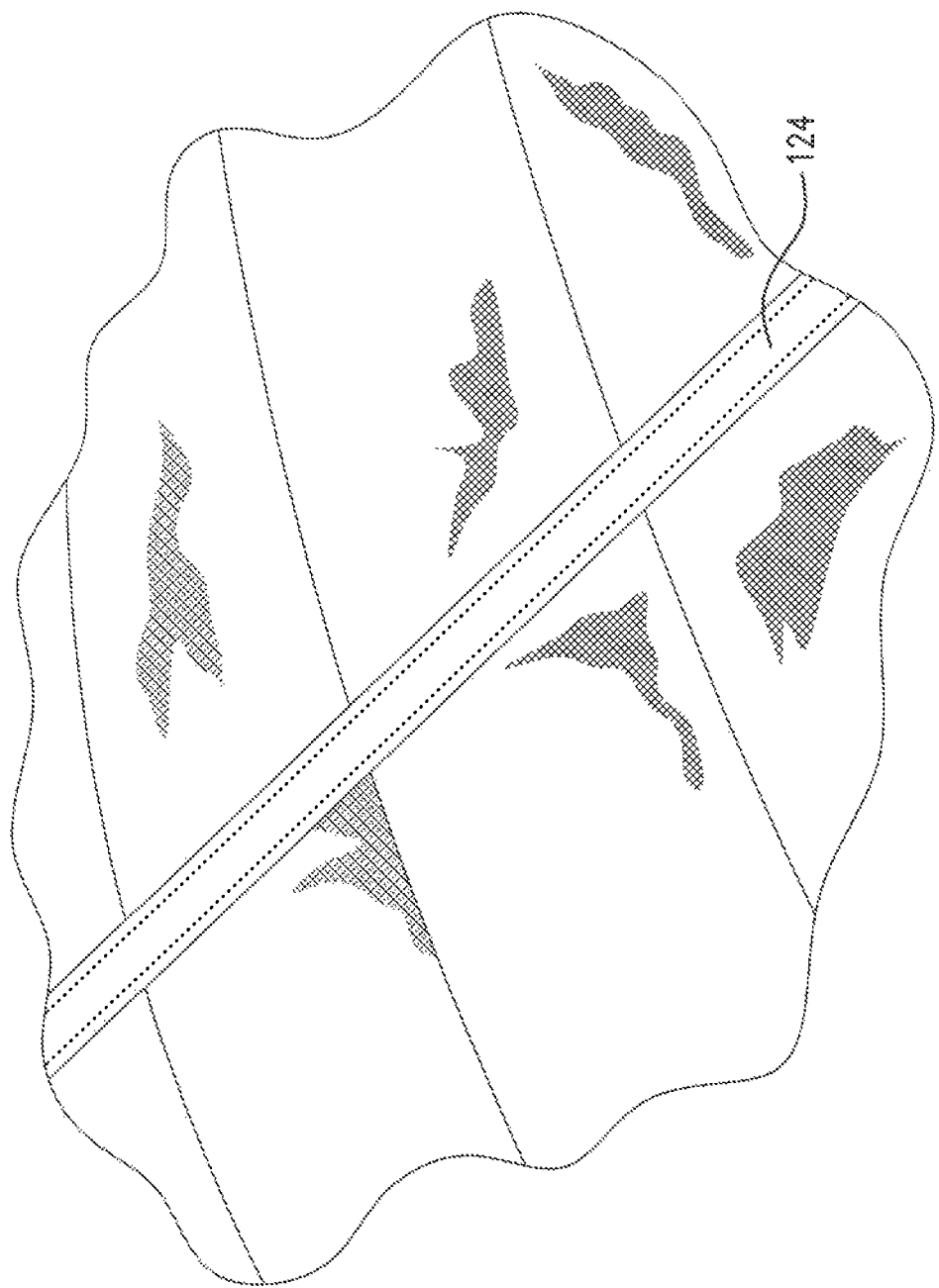
FIG. 8 shows an enlarged view of the circled area of FIG. 1
Figure 9:
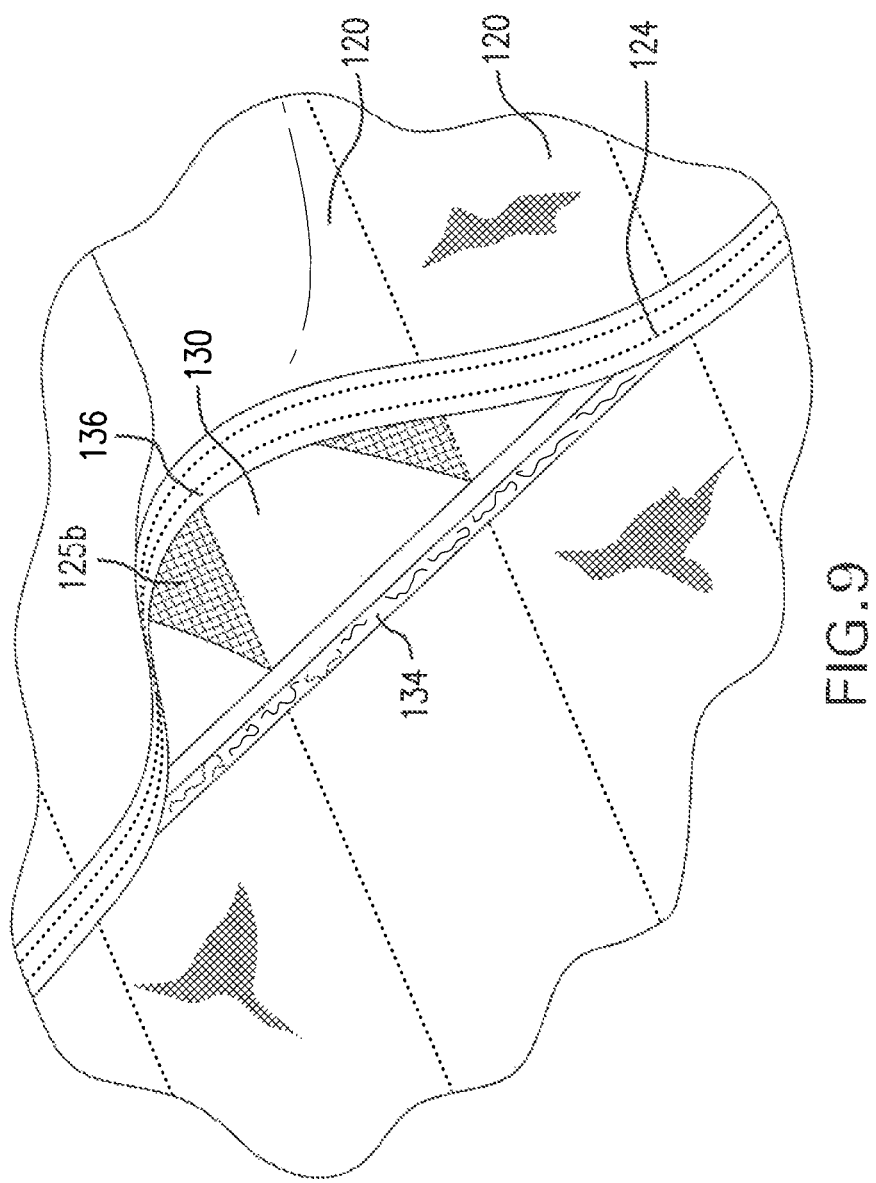
FIG. 9 shows a plurality of resealable channels according to one embodiment.
Figure 10:
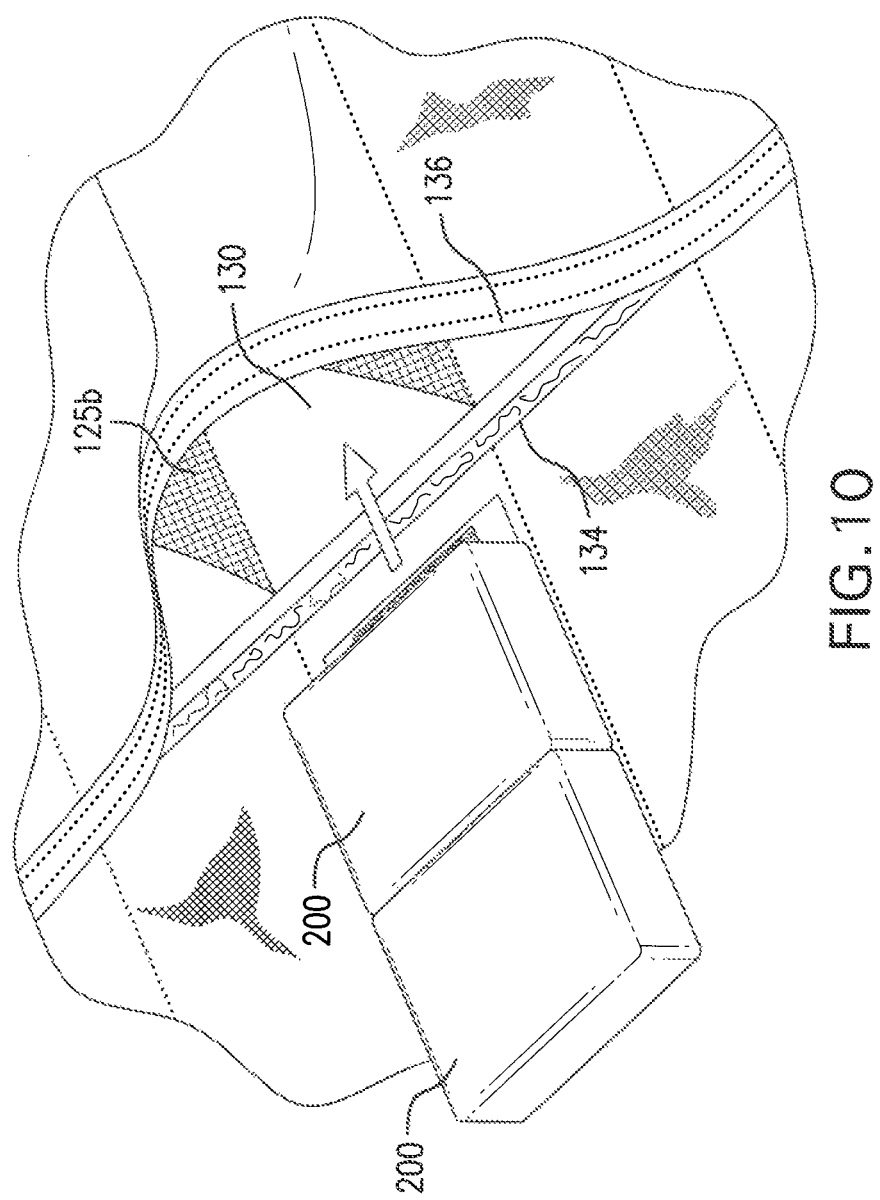
FIG. 10 shows the insertion of a plurality of connected insulation pouches into a resealable channel according to one embodiment.

The operation of filling a resealable channel 120 with box-type insulation pouches 200 according to one embodiment will now be described in reference to FIGS. 8-10. FIG. 8 shows an enlarged view of resealable closure 124 located on the back of coat 110 in the circled area of FIG. 1. First, a user opens resealable closure 124 to access resealable channels 120 as shown in FIG. 9. When a user opens resealable closure 124 interior volumes 130 of resealable channels 120 are exposed. While not shown specifically in FIG. 9, resealable closure 124 allows access to both sides of resealable channel 120 as described above in reference to FIG. 2B.

A user then attaches any number of insulation pouches 150 together, for example, two box-type insulation pouches 200. Once the desired number of insulation pouches 200 are attached, a user slides the insulation pouches 200 into the interior volume 130 of a resealable channel 120 as shown in FIG. 10. A user may insert any number of pouches into each channel 120 located on an article of equipment. After insulation pouches 200 are properly positioned within resealable channel(s) 120, the user may close resealable closure 124.

The sleeves 111 of coat 110 may be filled with insulation pouches in a similar fashion as described above in reference to FIGS. 8-10. In use, sleeves 111 of coat 110 may be turned inside-out to reveal a resealable closure 124. The user may then open. resealable closure 124 and fill each channel 120 in sleeves 111 with a desired amount of insulation pouches. Once the user fills the channels 120 in sleeves 111 with the desired amount of pouches and the resealable closure 124 is closed, the sleeves 111 may be flipped inside-out again thereby concealing resealable closure 124.

Figure 11A:
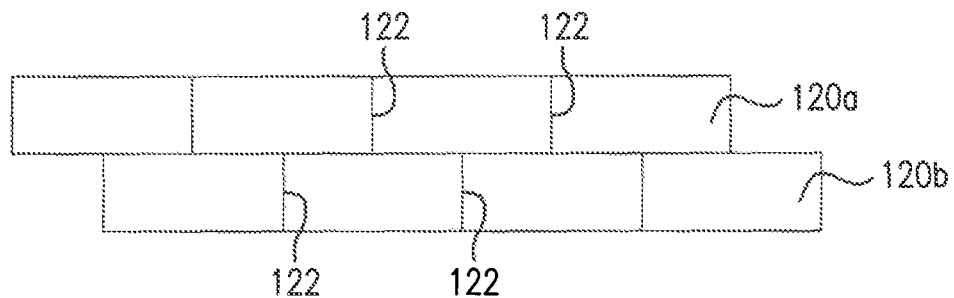
FIG. 11A is a side view and FIG. 11B is a top view of a double layer channel system according to one embodiment.
Figure 11B:
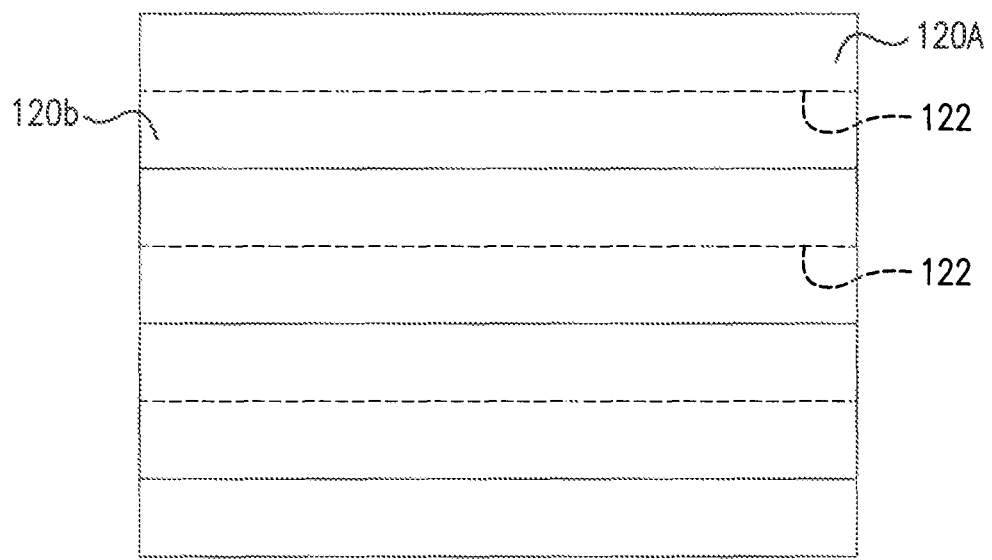

FIGS. 11A and 11B illustrate a side view and a top view, respectively, of a double layer channel system according to one embodiment. A double layer channel construction includes a layer of second channels 120b disposed over a layer of first channels 120a. As shown in FIGS. 11A and 11B, second channels 120b are offset from first channels 120a. The staggered and overlapping construction of first channels 120a and second channels 120b prevents cold air from penetrating through seams 122 located between channels. It is appreciated that any article of equipment may have channels configured in a double layer channel construction. It is also appreciated that the layering of channels is not limited to two layers. Articles of equipment may have three, four, etc. layers of overlapping and staggered channels.

Figure 12:
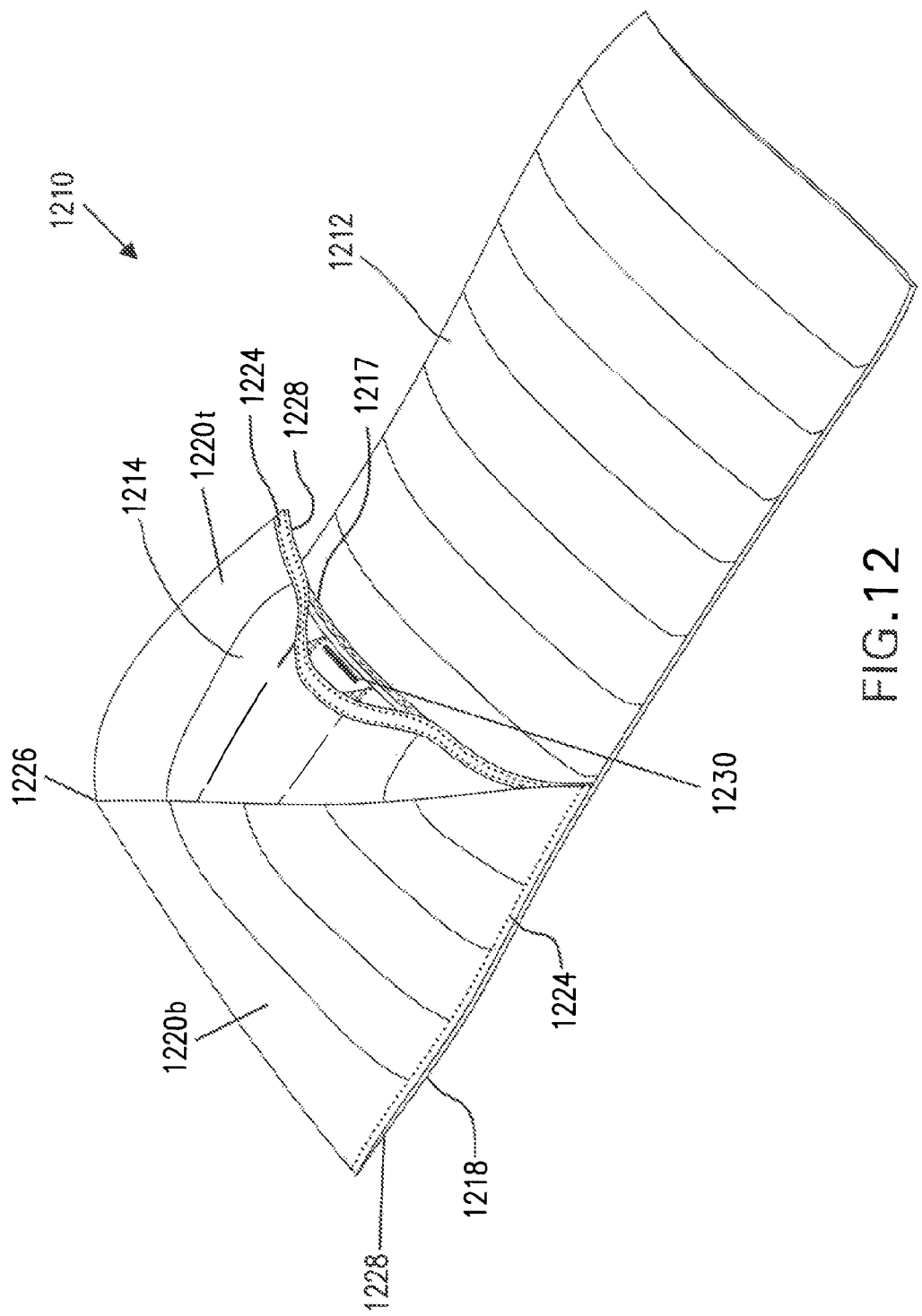
FIG. 12 shows a sleeping bag according to one embodiment.

FIG. 12 shows a sleeping bag 1210 having a plurality of resealable channels disposed between the sleeping bag's exterior layer 1212 and interior layer 1214. As shown in FIG. 12, two channels, top channel 1220t and bottom channel 1220b, may be aligned so as to extend from a first end 1217 of sleeping bag 1210 to a second end 1218 of sleeping bag 1210. Each channel 1220t and 1220b may have the same construction as channel 120, as described above in reference to FIG. 2A. Each channel may include a closed end 1226 and a resealable end 1228 where the closed 1226 of top channel 1220t abuts the closed end 1226 of bottom channel 1220b. Top channel 1220t may be configured to cover a top portion of the sleeping bag 1210 and bottom channel 1220b may be configured to cover a bottom portion of sleeping bag 1210. Each resealable end 1228 allows a user to fill the channels with a desired amount of insulation and can be sealed and un-sealed using a resealable closure 1224. Resealable closure 1224 may include similar sealing elements, such as first sealing member 134 and second sealing member 136, as described above with reference to FIG. 2A. Such a construction allows a user to increase or decrease insulation on the top and bottom of the sleeping bag to suit his or her needs. The two channel construction in FIG. 12 also increases the ease of filing the channels because a user does not have to push insulation along the entire width of the sleeping bag.

Access to resealable channels 1220t and 1220b via resealable closures 1224 may be provided by hook and loop fasteners, or other fasteners, disposed along the entire length of the sleeping bag. Alternatively, each channel may have a separate resealable closure, so that not all channels need be exposed to vary the insulation.

In some embodiments, a single channel may extend all the way from first end 1217 to second end 1218. In such embodiments, the channels may include two resealable ends 1228 each having a resealable closure 1224 (i.e. there is no closed end 1226). In such an embodiment, the user may access each channel from either resealable end 1228.

In some embodiments, resealable channels 1220*t* or 1220*b* may include one or more anchors 1230 for securing insulation pouches within the channels. Anchors 1230 may include but are not limited to, buttons, button holes, a zipper, hooks, loops, male snap fasteners, female snap fasteners, and other known releasable attachment means in the art. Preferably, anchors 1230 complement first attachment members 210 or second attachment members 214. For example, an anchor that is a loop may releasably attach to a first attachment member that is a hook. Anchors 1230 may be provided anywhere on the interior of the resealable channels. Preferably, anchors are provided near the end of the resealable channels for easy access.

Anchors 1230 allow resealable channels, such as 1220*b* and 1220*t*, to be partially filled with insulation pouches and prevent the insulation pouches from shifting within the channel. This allows a resealable channel to be filled with different amounts of insulation at different points within the channel. For example, anchor 1230 could be used to secure a row of insulation pouches in a portion of a resealable channel located on the top of sleeping bag 1210. In embodiments where a single channel extends all the way from first end 1217 to second end 1218, this may prevent insulation from migrating towards the bottom of sleeping bag 1210 under the user where insulation is less desired. While FIG. 12 shows anchors 1230 located in channels associated with sleeping bag 1210, it is appreciated that anchors may be provided in any type of equipment. For example, resealable channels 120 in coat 110 may have anchors for securing insulation pouches therein.

Any article of outdoor equipment may be designed with a plurality of resealable channels 120 as described herein. The article of outdoor equipment may be, but is not limited to, a coat FIG. 1), a jacket, a sleeping bag (FIG. 12), a tent, boots (FIG. 13), a hat (FIG. 14), a glove, pants, a vest, a sleeping pad, a comforter, and a blanket, as well as a liner for use with any of the foregoing.

Figure 13:
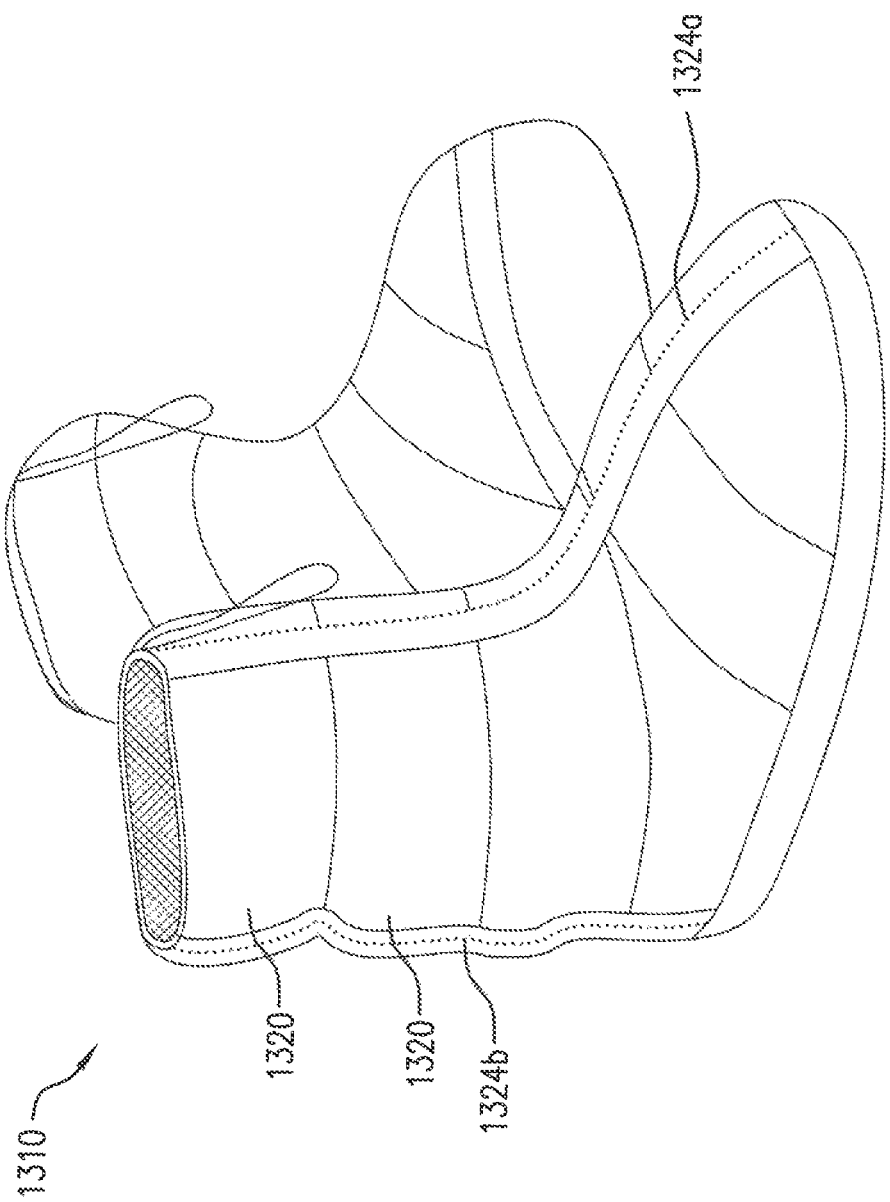
FIG. 13 shows a pair of boots according to one embodiment.

FIG. 13 shows a pair of boots 1310 having a plurality of resealable channels 1320 according to one embodiment. Resealable channels 1320 may have a similar construction as channels 120. Boots 1310 may include at least one resealable closure 1324*a* and 1324*b*. Resealable closures 1324*a* and 1324*b* may include similar sealing elements, such as first sealing member 134 and second sealing member 136, as described above with reference to FIG. 2A. Resealable closures 1324*a* and 1324*b* are accessible from the outside of boot 1310 and allow a user to add insulation pouches 150 to or remove insulation pouches 150 from resealable channels 1320.

In some embodiments, particularly when hoots 1310 are made from soft/flexible material, resealable closures 1324*a* and/or 1324*b* may be located on the interior of boot 1310 such that they are hidden from view. in such an embodiment, a user would turn the boots 1310 inside-out to access resealable closures 1324*a* and/or 1324*b*. In some embodiments, boots 1310 include both resealable closures 1324*a* and 1324*b*. In some embodiments, boots 1310 include only a single resealable closure, either resealable closure 1324*a* or resealable closure 1324*b*.

Figure 14:
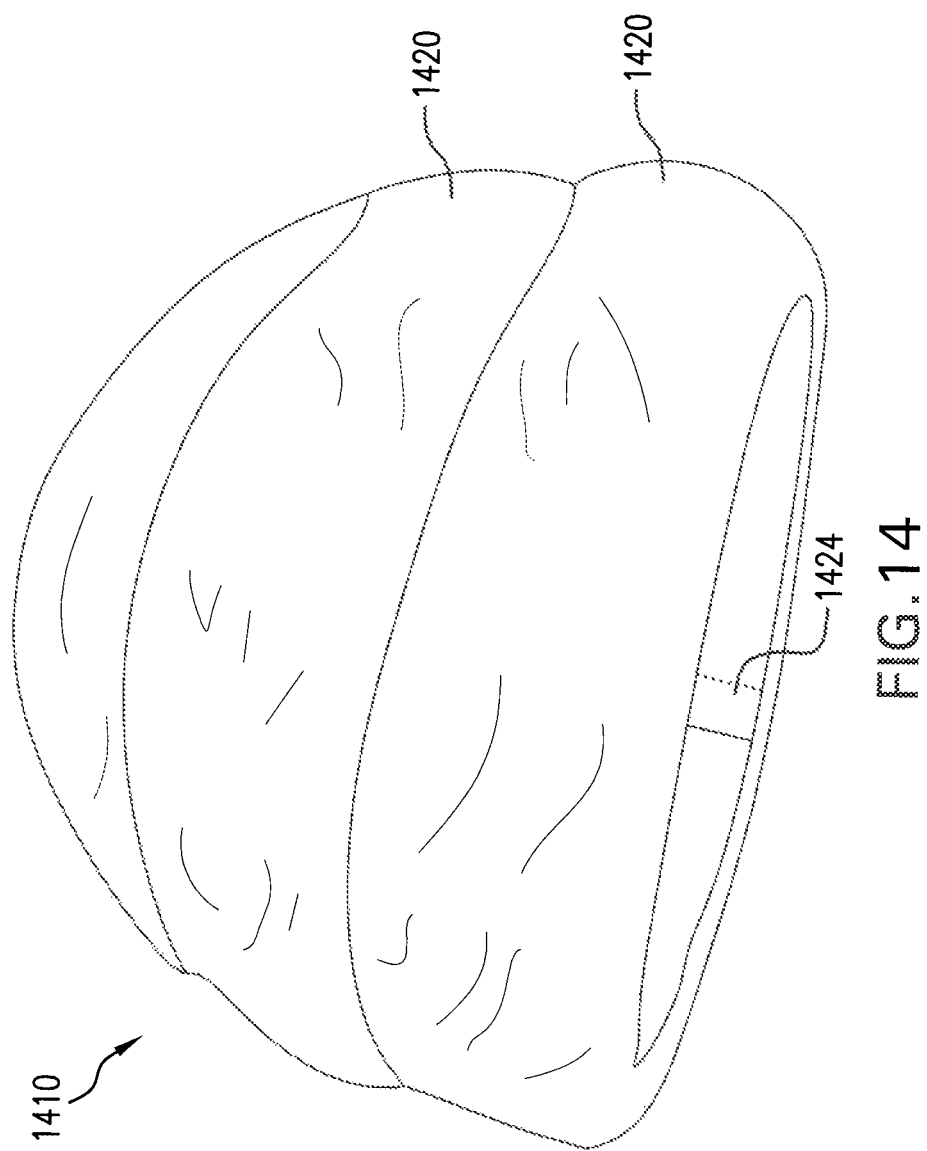
FIG. 14 shows a hat according to one embodiment.

FIG. 14 shows a hat 1410 having a plurality of resealable channels 1420 according to one embodiment. Resealable channels 1420 may have a similar construction as channels 120. Hat 1410 may include a resealable closure 1424 located on the inside of hat 1410. Resealable closure 1424 may include similar sealing elements, such as first sealing member 134 and second sealing member 136, as described above with reference to FIG. 2A. Resealable closure 1424 is accessed by turning hat 1410 inside-out and allows a user to add insulation pouches 150 to or remove insulation pouches 150 from resealable channels 1420.

In some embodiments, articles of equipment having resealable channels as described herein are manufactured with resealable channels, but those channels are left unfilled (no insulation pouches) by the manufacturer. In sonic embodiments, the manufacture prefills the channels with insulation pouches. In either case, a user would be able to separately purchase the article of equipment and corresponding or additional insulation pouches.

In practice, a user can fill any article of equipment having a plurality of resealable channels as described herein with insulation pouches. For example, a user could stuff his sleeping bag with insulation pouches for a comfortable night's sleep in very cold weather. Upon waking the next day, he could move some of those insulation pouches into his jacket to suit the day's conditions. A sleeping bag typically requires more insulating material than a jacket; therefore the user would likely have some insulation pouches left over inside the sleeping bag after stuffing his jacket. He could use the leftover pouches to stuff pants, hats, or any other article of equipment having a plurality of resealable channels as described herein. In any case, the pouches could be installed in a double or single layer configuration in order to provide more or less warmth.

This may be particularly beneficial for users who need to pack and transport equipment while not in use. The bulk and weight of the equipment carried by the user can be significantly reduced when the insulation is removed and installed in a piece of equipment that is in use at the time. Since the insulation pouches are modular and interchangeable they can be placed in any article of equipment having a plurality of resealable channels as described herein. This may be beneficial for families that requite a new garment size from year to year for a growing child. A family could purchase a shell and corresponding insulation pouches for their child's current winter coat. The following season, they may need to purchase a larger shell, but can re-use all the insulation pouches from last year's coat, with the possible addition of a few more pouches to till out the larger shell.

The flexibility and interchangeability of articles of equipment having resealable channels as described herein may also be highly beneficial for military personnel. Soldiers could be issued articles having resealable channels and could be given more or less insulation pouches depending on the location of their assignment. This may reduce the total number of items issued to each soldier. For example, a solider could be given a single jacket instead of three different jackets for different climates and/or times of the day. A solider could use the same equipment for different assignments across the globe. He or she would only need to be issued more or less insulation pouches depending on the assignment. Additionally, since soldiers typically transport their equipment with them, the bulk and weight of the equipment not in use can be significantly reduced as described above. Furthermore, since the insulation pouches and channel sizes could be standardized across all equipment, insulation pouches could be shared, repurposed, exchanged, etc. across multiple articles of equipment and soldiers without regard for the individual's size.

In some embodiments, resealable channels 120 can be filled with loose insulating material, which might include natural material (e.g., goose down), synthetic fill, or man-made or natural debris (crumpled newspaper, dry leaves, etc.). This allows an article of equipment to be insulated on-site, as needed and with whatever material a user has on hand. As such, the resealable channels 120 can provide shelter from the elements and protection from hypothermia even if a user does not have any insulation pouches or does not have enough insulation pouches on hand to fill the channels.

Resealable channels 120 according to some embodiments may be implemented via one of three general design approaches: 1) integrated, 2) component, 3) retro-fit.

The integrated approach refers to articles that are manufactured with channels 120 built into the article in such a way that they are always present, whether in use and filled with insulation pouches or not.

The component approach refers to articles that are manufactured with custom fitted, but removable channels 120. An example of this approach might be a highly tailored garment, such as a man's topcoat that is designed to be worn in a traditional manner, but also comes with a removable liner that contains channels 120. When conditions warrant additional warmth from the coat, the user would install the liner and fill channels with insulation pouches.

The retro-fit approach is similar to the component approach in that it also makes use of removable channels 120. However, unlike the component approach, the article of equipment itself may or may not come with specifically designed channels 120. The retro-fit approach focuses on installing a set of anchor points for attaching at least one resealable channel, which may come with the article of equipment or be purchased separately. The anchor points could be installed during the article's manufacture or at a later point. The mechanism for attaching resealable channels to the article may include, but is not limited to, buttons, zippers, hook and loop attachments, etc.

In some embodiments, the retro-fit approach may include removing the insulation from original channels located in an article of outdoor equipment. This insulation material could be processed into insulation pouches, e.g., box-type insulation pouches 200, for insertion into resealable channels. In some embodiments, the retro-fit approach may include fabricating a plurality of resealable channels on the article of outdoor equipment using at least a portion of the original channels.

A user may not always have more than one piece of equipment having resealable channels on hand and thus not be able to use the equipment as storage for extra insulation pouches 150 not currently needed. An example of this might be a skier who wants to vary his ski jacket insulation for warmer daytime runs and then also for colder night skiing.

Figure 15:
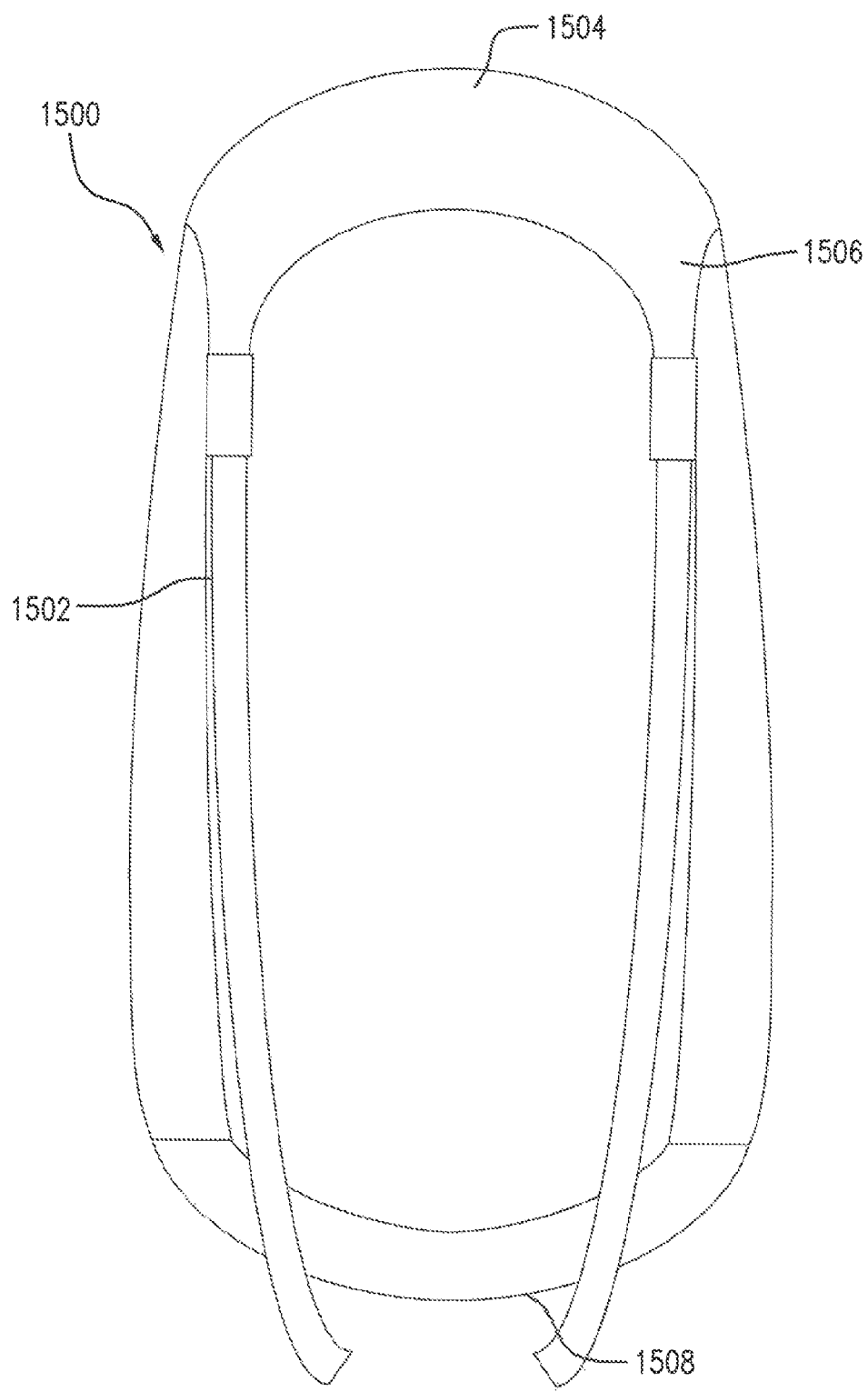
FIG. 15 shows a compression sack according to one embodiment.

FIG. 15 shows a compression sack 1500 for storing extra insulation pouches 150 according to one embodiment. Compression sack 1500 may be used to store insulation pouches that are not currently needed in a piece of equipment. Compression sack 1500 would maintain the light weight of the insulation pouches, while forcing them into a very small and convenient volume for easy transport. Compression sack 1500 may include an open end 1504 and a closed end 1508. Open end 1504 may include a flap 1506 for opening and closing open end 1504.

Figure 16:
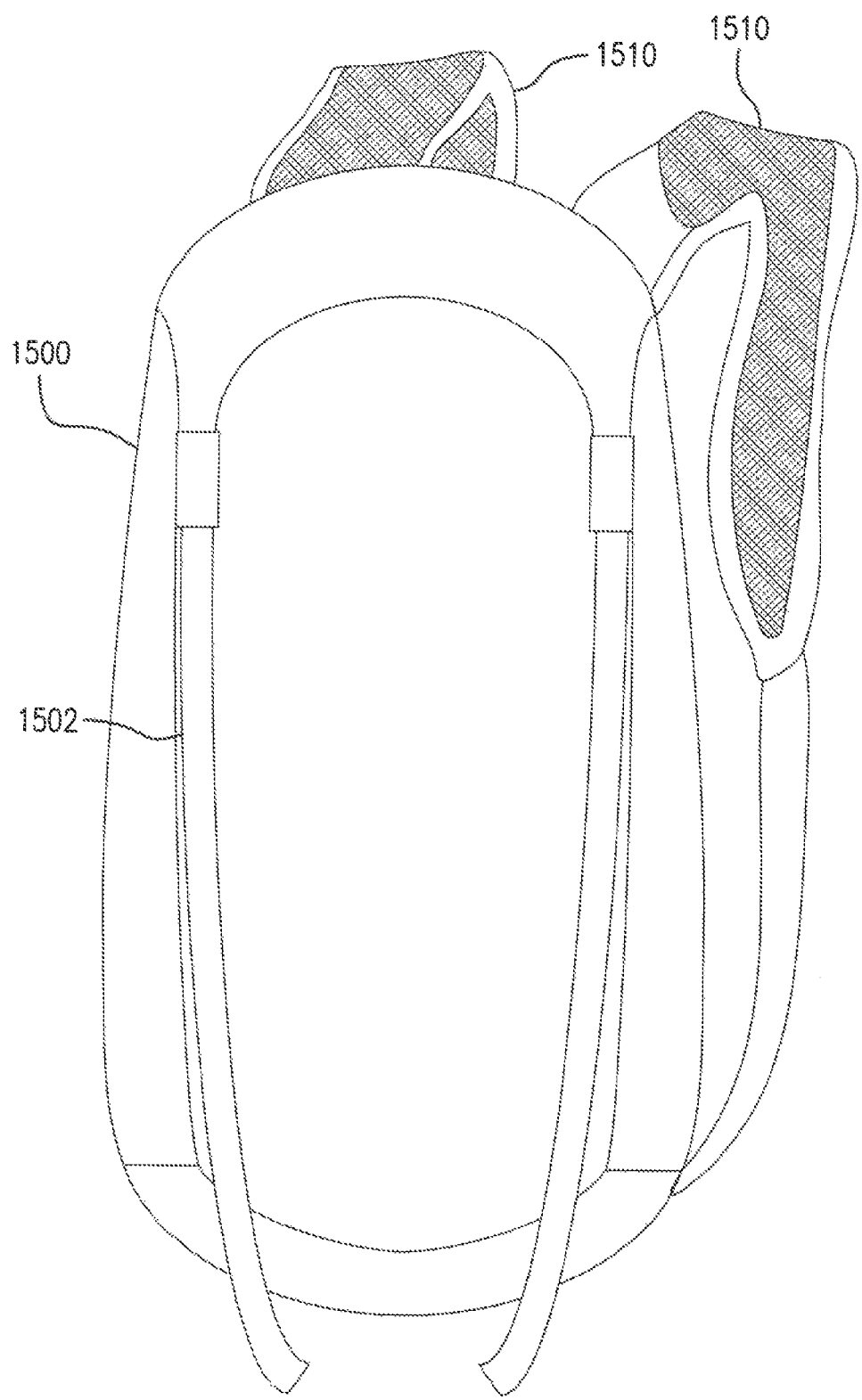
FIG. 16 shows a compression sack according to one embodiment.
Figure 17:
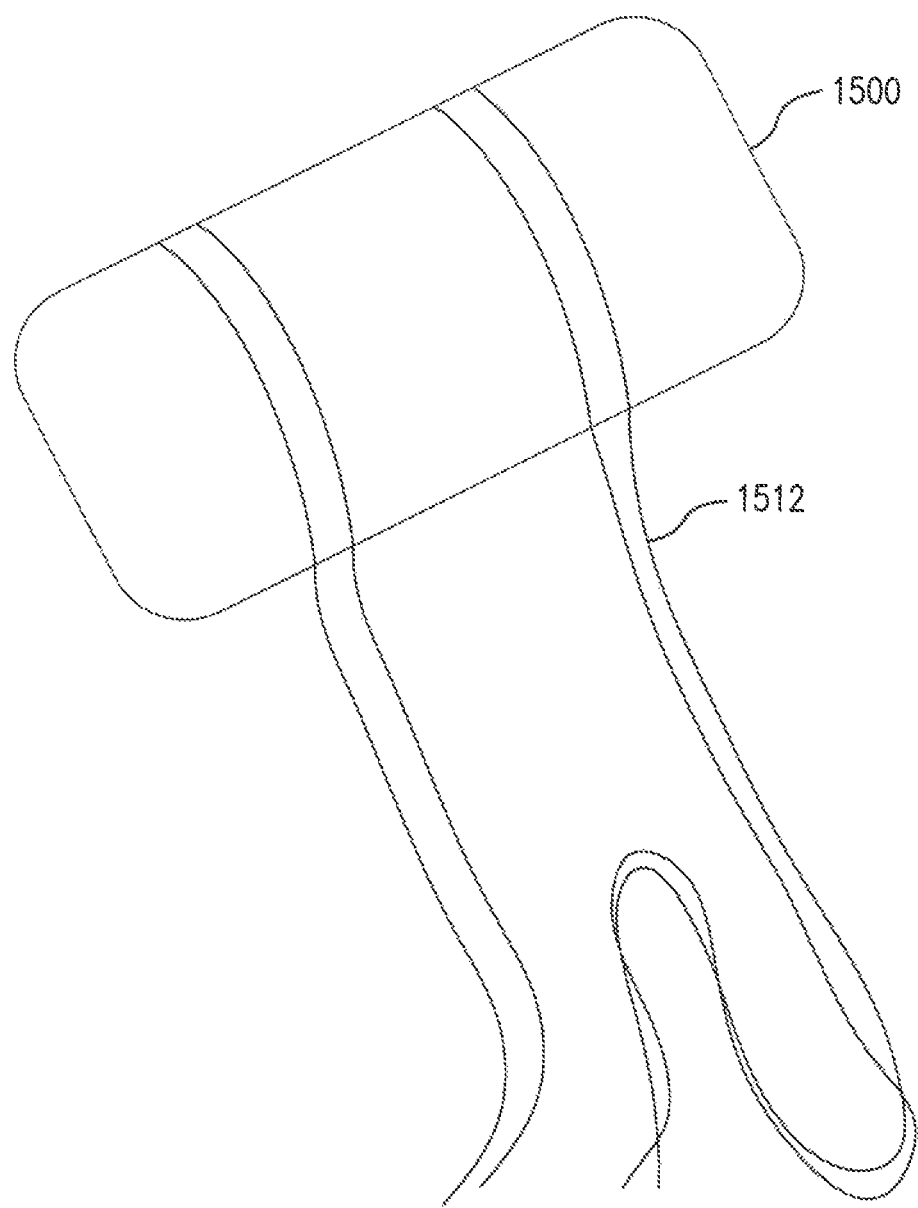
FIG. 17 shows a compression sack according to one embodiment.

Compression sack 1500 would utilize typical compression sack methods to compress the insulation pouches. For example, compression sack may include one or more ties 1502 for compressing the contents, e.g., the insulation pouches 150 within compression sack 1500. Compression sack 1500 is scaled to fit the insulation pouches and designed to be carried via an attachment or tethering system that would allow the sack to be attached to pieces of equipment or carried via convenient straps or slings. For example, as shown in FIG. 16, compression sack 1500 may include one or more straps 1510 designed to fit over a user's shoulder. Additionally or alternatively, as shown in FIG. 17, compression sack 1500 may include one or more tethers 1512 for attaching compression sack 1500 to a piece of equipment such as a backpack.

In addition to serving as a convenient storage unit, compression sack 1500 could also function as a piece of equipment. For example, by adjusting the level of compression, a compression sack attached to the lower back portion of a parka style coat could provide an insulated and soft seating pad. Likewise, a compression sack might be used as a pillow while traveling or camping after some of the compression was released to provide a softer package.

While the above description refers to articles of outdoor equipment, it is appreciated that any item of clothing or article used for warmth could include a plurality of resealable channels as described herein. Other articles include but are not limited to, a bedroom duvet, a muff, a sweater, a robe, etc.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A coat comprising:
an interior layer;
an exterior layer;
a plurality of resealable channels disposed between the interior layer and the exterior layer;
wherein the plurality of resealable channels are disposed in a body of the coat and one or more sleeves of the coat; and
wherein the plurality of resealable channels are configured to receive at least one insulation pouch.

2. A sleeping bag comprising:
an interior layer;
an exterior layer;
a first set of resealable channels disposed along the top of the sleeping bag between the interior layer and the exterior layer, each resealable channel in the first set of resealable channels comprising a closed end and a resealable end;
a second set of resealable channels disposed along the bottom of the sleeping bag between the interior layer and the exterior layer, each resealable channel in the second set of resealable channels comprising a closed end and a resealable end;

wherein the closed ends of the first set of resealable channels abut the closed ends of the second set of resealable channels;

wherein each of the first set of resealable channels extends across the entire width of the top of the sleeping bag and each of the second set of resealable channels extends across the entire width of the bottom of the sleeping bag; and wherein each resealable channel is configured to receive at least one insulation pouch wherein the resealable channels each have a height, a width, and a length; wherein the insulation pouch has a height, a width, and a length; and wherein the length of at least one of the resealable channels is at least twice the length of the insulation pouch.

* * * * *